(12) United States Patent
Lim et al.

(10) Patent No.: US 11,792,436 B2
(45) Date of Patent: *Oct. 17, 2023

(54) METHOD AND APPARATUS FOR ENCODING/DECODING VIDEO

(71) Applicant: SK TELECOM CO., LTD., Seoul (KR)

(72) Inventors: Jeong-yeon Lim, Seoul (KR); Jae Seob Shin, Seoul (KR); Sun Young Lee, Seoul (KR); Se Hoon Son, Seoul (KR); Tae Young Na, Seoul (KR); Jae Il Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,934

(22) Filed: Oct. 20, 2022

(65) Prior Publication Data

US 2023/0057302 A1    Feb. 23, 2023

Related U.S. Application Data

(63) Continuation of application No. 17/046,422, filed as application No. PCT/KR2019/004213 on Apr. 9, 2019, now Pat. No. 11,509,937.

(30) Foreign Application Priority Data

Apr. 9, 2018  (KR) .................. 10-2018-0041165
Apr. 10, 2018 (KR) .................. 10-2018-0041702
(Continued)

(51) Int. Cl.
*H04N 19/70*   (2014.01)
*H04N 19/513*  (2014.01)

(52) U.S. Cl.
CPC .......... *H04N 19/70* (2014.11); *H04N 19/513* (2014.11)

(58) Field of Classification Search
CPC ......................... H04N 19/70; H04N 19/513
See application file for complete search history.

(56) References Cited

U.S. PATENT DOCUMENTS 9,894,422 B2    2/2018  Hwang et al.
10,743,000 B2   8/2020  Lim et al.
(Continued)

FOREIGN PATENT DOCUMENTS

KR   10-2016-0109617 A   9/2016
KR      10-1710290 B1    2/2017
(Continued)

OTHER PUBLICATIONS

International Search Report dated Jul. 11, 2019, in connection with corresponding International Patent Application No. PCT/KR2019/004213.

*Primary Examiner* — Fabio S Lima
(74) *Attorney, Agent, or Firm* — Hauptman Ham, LLP

(57) ABSTRACT

Disclosed is a method and apparatus for encoding/decoding a video. According to an embodiment, provided is a method of setting a level for each of one or more regions, including decoding a definition syntax element related to level definition and a designation syntax element related to target designation from a bitstream; defining one or more levels based on the definition syntax element; and setting a target level designated by the designation syntax element among the defined levels for a target region designated by the designation syntax element.

12 Claims, 26 Drawing Sheets

(30) Foreign Application Priority Data

| Dec. 27, 2018 | (KR) | .......................... 10-2018-0171262 |
| Apr. 5, 2019 | (KR) | .......................... 10-2019-0040156 |
| Apr. 8, 2019 | (KR) | .......................... 10-2019-0040909 |
| Apr. 8, 2019 | (KR) | .......................... 10-2019-0041006 |

(56) References Cited

U.S. PATENT DOCUMENTS

| 2013/0156101 A1* | 6/2013 | Lu .......................... H04N 19/44 |
| | | 375/E7.246 |
| 2014/0192859 A1 | 7/2014 | Haque et al. |
| 2015/0172693 A1* | 6/2015 | Yang .................... H04N 19/463 |
| | | 375/240.26 |
| 2015/0256856 A1* | 9/2015 | Tsukuba ................ H04N 19/44 |
| | | 375/240.25 |
| 2017/0318301 A1* | 11/2017 | Li .......................... H04N 19/70 |
| 2019/0335182 A1* | 10/2019 | Lim .................... H04N 5/2624 |
| 2020/0029078 A1* | 1/2020 | Pu ........................ H04N 19/124 |
| 2020/0092600 A1* | 3/2020 | Di ................. H04N 21/440245 |
| 2020/0142224 A1* | 5/2020 | Schwarz .............. G02C 13/003 |
| 2021/0021830 A1* | 1/2021 | Francois ................ H04N 19/70 |

FOREIGN PATENT DOCUMENTS

| KR | 10-1809968 B1 | 12/2017 |
| KR | 10-2918-0004029 A | 1/2018 |
| KR | 10-2018-0035089 A | 4/2018 |

* cited by examiner

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |

*FIG. 14*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |
| 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 |
| 176 | 177 | 178 | 179 | 180 | 181 | 182 | 183 | 184 | 185 | 186 | 187 | 188 | 189 | 190 | 191 |

*FIG. 18*

(a) Reference picture (b) Current picture

METHOD AND APPARATUS FOR ENCODING/DECODING VIDEO

CROSS-REFERENCE TO RELATED APPLICATION

This present application is a continuation of U.S. patent application Ser. No. 17/046,422, filed on Oct. 9, 2020, which is a national stage filing under 35 U.S.C § 371 of PCT application number PCT/KR2019/004213 filed on Apr. 9, 2019 which is based upon and claims the benefit of priority to Korean Patent Application Nos. 10-2018-0041165 filed on Apr. 9, 2018; 10-2018-0041702 filed on Apr. 10, 2018; 10-2018-0171262 filed on Dec. 27, 2018; 10-2019-0040156 filed on Apr. 5, 2019; 10-2019-0041006 filed on Apr. 8, 2019; and 10-2019-0040909 filed on Apr. 8, 2019 in the Korean Intellectual Property Office, which are incorporated herein in their entireties by reference.

TECHNICAL FIELD

The present disclosure relates to encoding and decoding of video, and more particularly, to a method and apparatus for encoding/decoding video with improved encoding and decoding efficiency.

BACKGROUND

Since the data volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and plays the video data. Compression techniques for such video include H.264/AVC and High Efficiency Video Coding (HEVC), which improves coding efficiency over H.264/AVC by about 40%.

However, since the size, resolution, and frame rate of video are gradually increasing, and thus the amount of data to be encoded is also increasing. Accordingly, a new compression technique having better encoding efficiency and higher quality than the existing compression technique is required.

SUMMARY

Technical Problem

An object of the present disclosure devised to meet such a requirement is to provide an improved video encoding and decoding technology.

Technical Solution

In accordance with one aspect of the present disclosure, provided is a method of setting a level for each of one or more regions, the method including decoding a definition syntax element related to level definition and a designation syntax element related to target designation from a bitstream; defining one or more levels based on the definition syntax element; and setting a target level designated by the designation syntax element among the defined levels for a target region designated by the designation syntax element.

In accordance with another aspect of the present disclosure, provided is a method of configuring a picture, including determining whether to split the picture into a plurality of tiles, and splitting the picture into the plurality of tiles according to the determination, generating a PPS including information about the split tiles, and generating each tile header including a tile ID of each of the split tiles, wherein the information about the split tiles includes information about whether the picture is split into the plurality of tiles, and whether all the split tiles are independent from each other.

In accordance with another aspect of the present disclosure, provided is a method of configuring a picture, including splitting the picture into tiles, setting information about the split tiles in a picture level header, setting a plurality of tiles among the split tiles as one tile group, setting information about the tile group in a tile group header, and configuring a network abstraction layer (NAL) unit including the tile group and the tile group header.

As described above, according to an embodiment of the present disclosure, encoding and decoding optimized for picture quality of the target region may be implemented by setting different levels or tiers for respective target regions.

According to another embodiment of the present disclosure, a viewport region corresponding to an actual picture display target may be distinguished from other regions by setting different levels or tiers for respective target regions. Thereby, selective decoding may be implemented.

According to another embodiment of the present disclosure, since parallel processing or distributed processing is allowed to be performed on divided pictures, encoding and decoding may be performed quickly.

BRIEF DESCRIPTION OF DRAWINGS

FIG. 14 is a diagram illustrating an example of an MCTS included in one picture.

FIG. 18 is a diagram illustrating an example of a picture according to a third embodiment of the present disclosure.

DETAILED DESCRIPTION

Figure 1:
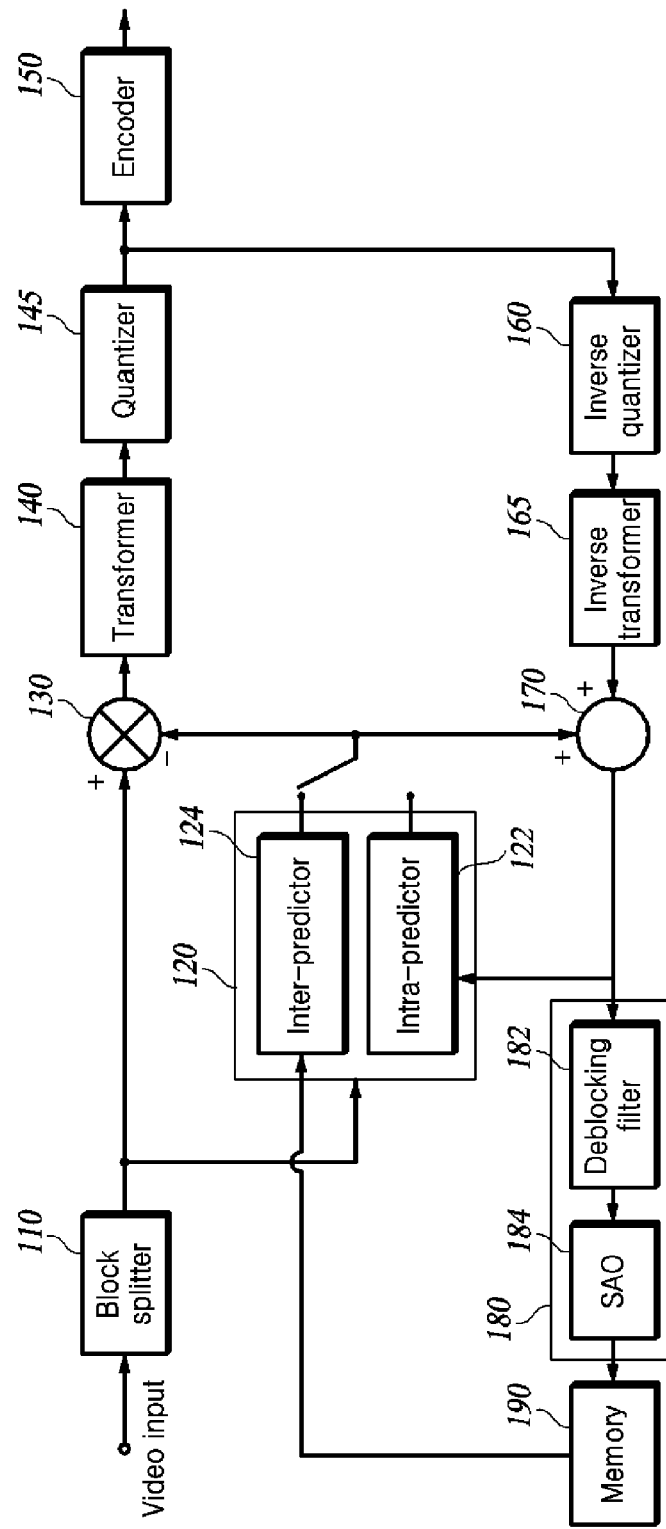
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

As shown in FIG. 1, the video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles. Here, the one or more tiles may be defined as a tile group. Each tile is split into one or more coding tree units (CTUs). Each CTU is split into one or more coding units (CUs) by a tree structure.

Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of tile group to which the tile belongs, and information applied to all blocks constituting one picture is encoded in a picture parameter set (PPS) or a picture header.

Further, information referred to by a plurality of pictures in common is encoded in a sequence parameter set (SPS), and information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the split CTUs using a tree structure. In the tree structure, a leaf node serves as a coding unit (CU), which is a basic unit of coding.

The tree structure may include a QuadTree (QT), in which a node (or parent node) is split into four sub-nodes (or child nodes) having the same size, a BinaryTree (BT), in which a node is split into two sub-nodes, and a TernaryTree (TT), in which a node is split into three sub-nodes at a ratio of 1:2:1.

The tree structure may also include a structure formed by a combination of two or more of the QT structure, the BT structure, and the TT structure. For example, a Quad Tree plus Binary Tree (QTBT) structure may be used, or a Quad Tree plus Binary Tree Ternary Tree (QTBTTT) structure may be used.

Figure 2:
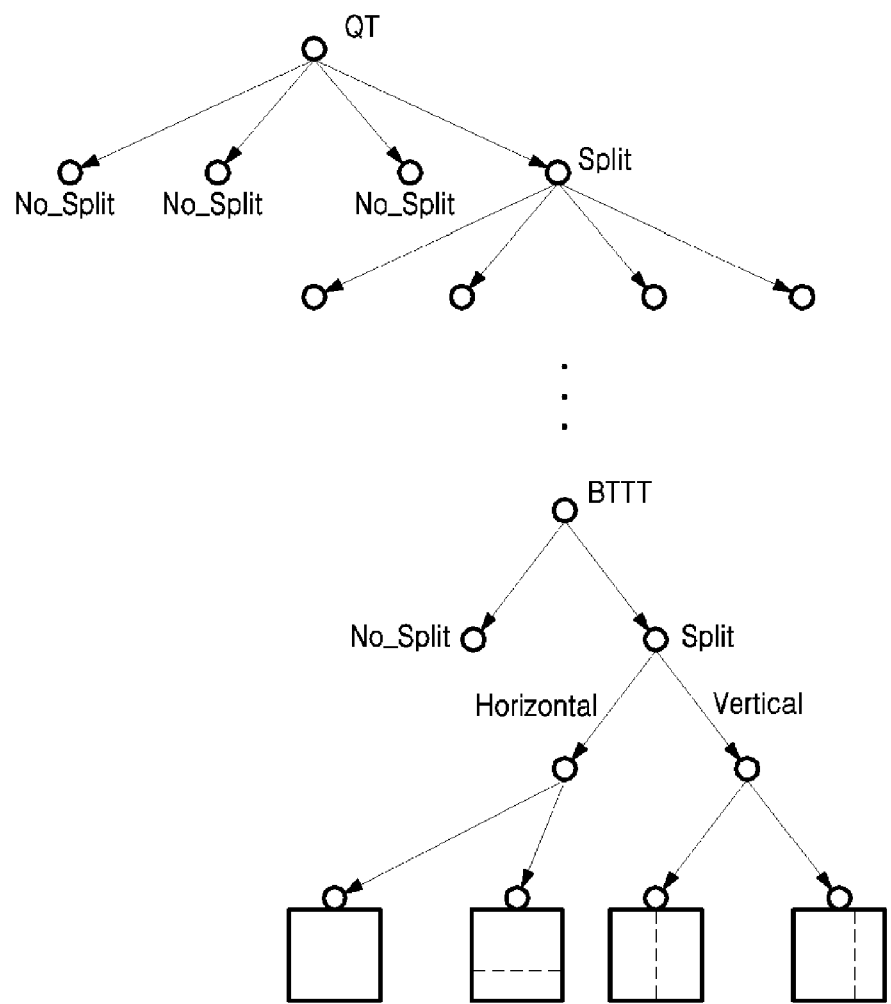
FIG. 2 is a diagram illustrating block splitting using a QTBTTT structure.

FIG. 2 is a diagram illustrating a method of splitting a block using a QTBTTT structure. As shown in FIG. 2, a CTU may be initially split in the QT structure. The QT splitting may be repeated until the size of the splitting block reaches the minimum block size (MinQTSize) of a leaf node allowed in the QT.

When the leaf node of the QT is not larger than the maximum block size (MaxBTSize) of the root node allowed in the BT, it may be further split into one or more of the BT structure or the TT structure. The BT structure and/or the TT structure may have a plurality of splitting directions.

In some example, there may be two splitting types, namely, a type of horizontally splitting a block of a node (i.e., horizontal splitting) and a type of vertically splitting the block (i.e., vertical splitting).

As shown in FIG. 2, when BTTT splitting is performed, a flag indicating whether the nodes are split, a flag indicating the splitting direction (vertical or horizontal), and/or a flag indicating the splitting type (binary or ternary) may be signaled to the video decoding apparatus.

There may be an additional type, which is splitting a block of a node into two asymmetric blocks. The asymmetric splitting type may include a type of splitting a block into two rectangular blocks at a size ratio of 1:3, and a type of diagonally splitting a block of a node.

When QTBT is used as another example of the tree structure, the CTU is first split in a QT structure, and then leaf nodes of the QT may be further split in a BT structure.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a prediction block. The predictor 120 includes an intra-predictor 122 and an inter-predictor 124. In general, each of the current blocks in a picture may be predictively coded. Prediction of a current block may be performed using the technique of intra-prediction, which is performed based on the data of a picture containing the current block, or the technique of inter-prediction, which is performed based on the data of a picture coded before the picture containing the current block.

Figure 3:
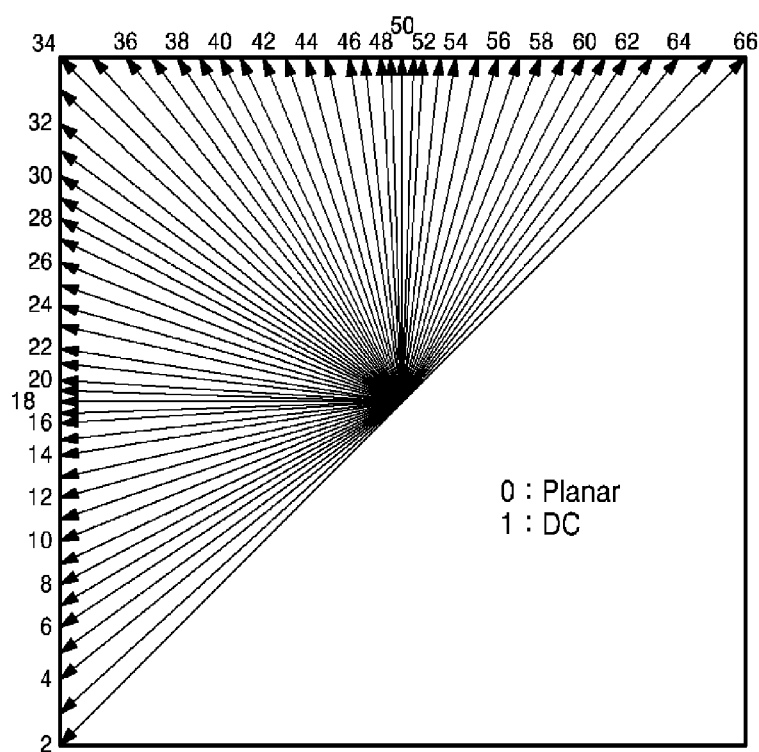
FIG. 3 is a diagram illustrating a plurality of intra-prediction modes.

The intra-predictor 122 predicts pixels in the current block using pixels (reference pixels) positioned around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes.

For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 searches for a block most similar to the current block in a reference picture encoded and decoded earlier than the current picture through a motion estimation process, and generates a predicted block for the current block using the block that is found through the motion estimation process. In general, inter-prediction may be classified into uni-directional prediction and bi-directional prediction according to a prediction direction.

The inter-predictor 124 generates a motion vector corresponding to a displacement between the current block in the current picture and the predicted block in the reference picture. In general, motion estimation is performed on a luma component, and a motion vector calculated based on the luma component is used for both the luma component and the chroma component.

Motion information including information about the reference picture and information about a motion vector used to predict the current block is encoded by the encoder 150 and transmitted to the video decoding apparatus.

Various methods may be used to reduce or minimize the amount of bits required to encode the motion information. Representative examples of these methods may include a skip mode, a merge mode, and an adaptive (advanced) motion vector predictor (AMVP) mode.

In the skip mode and merge mode, first, a preset number of candidate blocks are selected from among the neighboring blocks. When the candidate blocks are selected, the inter-predictor 124 configures a merge list including the candidate blocks, selects motion information to be used as the motion information of the current block from among the motion information about the candidate blocks included in the list, and then generates a merge index value for identifying the selected motion information (selected candidate block).

The index value of the selected motion information, that is, the merge index value is encoded and signaled to the video decoding apparatus. In the standard HEVC, the index value for the skip/merge mode is presented through the merge_idx syntax.

In the AMVP mode, first, motion vector predictor (MVP) candidates for the motion vector of the current block are derived using blocks neighboring the current block. Once the MVP candidates are derived, the inter-predictor 124 determines an MVP for the motion vector of the current block, subtracts the determined MVP from the motion vector of the current block, and subtracts the motion vector of the current block to calculate a motion vector difference (MVD). The calculated MVD is encoded and signaled to the video decoding apparatus.

The process of determining the MVP from among the MVP candidates may be implemented through a predefined function (e.g., calculation of a median, an average, or the like). In this case, the video decoding apparatus is set to apply the predefined function.

Since the neighboring blocks used to derive the MVP candidates correspond to blocks that have already been encoded and decoded, the video decoding apparatus also already recognizes the motion vectors for the neighboring blocks. Accordingly, since information for identifying MVP candidates does not need to be encoded. Therefore, the video encoding apparatus encodes only information on the MVD and information on the reference picture used to predict the current block.

The process of determining the MVP from among the MVP candidates may be implemented by selecting any one of the MVP candidates. In this case, information for identifying the determined MVP is also encoded together with the information on the MVD and the information on the reference picture used to predict the current block.

The subtractor 130 generates a residual block by performing subtraction with the predicted block generated by the intra-predictor 122 or the inter-predictor 124 and the current block, and the transformer 140 transforms a residual signal in a residual block having pixel values in the spatial domain into a transform coefficient in the frequency domain.

The transformer 140 may transform the residual signals in the residual block using the size of the current block as a transformation unit, split the residual block into a plurality of smaller sub-blocks, and transform the residual signals in a transformation unit of the sub-block size.

There may be various methods of splitting the residual block into smaller sub-blocks. For example, the residual block may be split into sub-blocks of the same predefined size, or quad-tree (QT) type splitting using a residual block as a root node may be employed.

The quantizer 145 quantizes transform coefficients output from the transformer 140, and outputs the quantized transform coefficients to the encoder 150.

The encoder 150 generates a bitstream by encoding the quantized transform coefficients using an encoding method such as CABAC. In addition, the encoder 150 encodes and signals information such as the CTU size, QT split flag, BTTT split flag, split direction and split type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and an SAO filter 184.

The deblocking filter 180 filters the boundary between the reconstructed blocks to remove blocking artifacts caused by block-by-block encoding/decoding, and the SAO filter 184 additionally filters the deblocking filtered video.

The SAO filter 184 corresponds to a filter used to compensate for a difference between a reconstructed pixel and an original pixel caused by lossy coding. The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Figure 4:
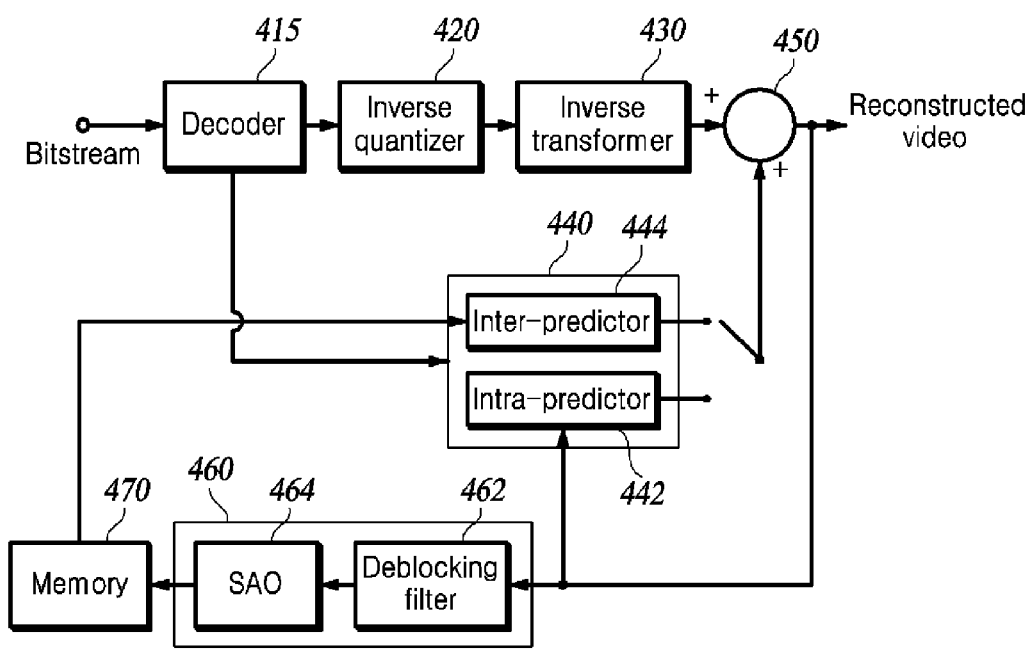
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

As shown in FIG. 4, the video decoding apparatus may include a decoder 410, an inverse quantizer 420, an inverse transformer 430, a predictor 440, an adder 450, a filter unit 460, and a memory 470.

Similar to the video encoding apparatus shown in FIG. 1, each element of the video decoding apparatus may be implemented as a hardware chip. In addition, the function of each component may be implemented as software, and a microprocessor may be configured to execute the function of each software.

The decoder 410 decodes the bitstream received from the video encoding apparatus and extracts information related to block splitting (splitting information on a luma block and/or splitting information on a chroma block). The decoder determines the current block to be decoded based on the extracted information, and extracts prediction information and residual signal information necessary to reconstruct the current block.

The decoder 410 extracts information about the CTU size from the sequence parameter set (SPS) or the picture parameter set (PPS), determines the size of the CTU, and splits a picture into CTUs of the determined size. Further, the decoder 410 determines the CTU as the uppermost layer, that is, the root node of a tree structure, extracts splitting information from the bitstream, and then splits or reconstructs a block based on the extracted information.

In addition, the decoder 410 extracts information on whether the block is BT-split and the splitting type (splitting direction) for a node corresponding to a leaf node of the QT splitting and splits the leaf node in a BT structure.

As another example, when a block is to be split or reconstructed using the QTBTTT structure, the decoder 410 extracts information (flag) about whether the splitting is QT splitting, splits each node into four nodes of a lower layer. In the case where the node corresponds to a leaf node of QT splitting (a node where QT splitting no longer occurs), the decoder extracts information about whether the node is further split in the BT or TT structure, information about the splitting direction, and splitting type information indicating whether the splitting occurs in a BT structure or a TT structure to recursively split the node in the BT or TT structure.

As another example, when a block is to be split or reconstructed using the QTBTTT structure, the decoder 410 extracts information (e.g., a flag) about whether splitting is performed, and extracts the spiting type information when the block is split. When the splitting type is QT, the decoder 410 splits each node into four nodes corresponding to a lower layer. When the splitting type information indicates that the splitting type is the type of leaf node of QT splitting (a node where QT splitting no longer occurs), i.e., the node is split in the BT or TT structure, the decoder 410 additionally extracts information about the splitting direction and the splitting type information for distinguishing whether the splitting structure is a BT structure or a TT structure, and then splits the node in the BT or TT structure.

In this way, when the current block to be decoded is determined based the splitting information, the decoder 410 extracts information about a prediction type indicating whether the current block is subjected to intra-prediction or inter-prediction.

When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector (the motion information about the current block).

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the determined intra-prediction mode.

The inter-predictor 444 determines a motion vector of the current block and a reference picture referred to by the motion vector based on the syntax element for the inter-prediction mode extracted from the decoder 410, and predicts the current block based on the motion vector and the reference picture.

The adder 450 reconstructs the current block by adding the residual block output from the inverse transformer 430 and the predicted block output from the inter-predictor 444 or the intra-predictor 442. The pixels in the reconstructed current block are used as reference pixels for intra-prediction of a block to be decoded later.

The filter unit 460 includes a deblocking filter 462 and an SAO filter 464. The deblocking filter 462 removes blocking artifacts caused by block-by-block decoding by performing deblocking filtering on the boundary between reconstructed blocks.

The SAO filter 464 performs additional filtering on a reconstructed block after deblocking filtering in order to compensate for a difference between the reconstructed pixel and the original pixel caused by lossy coding.

The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

Prior to the detailed description of the present disclosure, terms referred to in the present specification are defined.

As used herein, a "region" refers to a target for which a level or a tier is set. The region may include a tile, a slice, a tile group, and a slice segment.

As used herein, a "region header" is a concept defined in relation to the "region." When the region corresponds to a tile, the region header corresponds to a tile header. When the region corresponds to a slice, the region header corresponds to a slice header. When the region corresponds to a tile group, the region header corresponds to a tile group header.

When the region corresponds to a picture, the region header corresponds to a picture parameter set (PPS) or a picture header. When the region corresponds to a plurality of pictures, the region header is a sequence parameter set (SPS). A region header for a region referred to in common by one or more SPSs corresponds to a video parameter set (VPS).

Conventional standards such as HEVC have used concepts such as a profile, a level, and a tier in consideration of an application to which the standard technology is applied and the performance of a video decoding apparatus (decoder).

A profile refers to a specification preset for various applications to which the standard technology is applied, and profiles such as 'Main profile', 'Main10 profile', and 'Main still picture profile' have been established in HEVC.

A level is a concept used in consideration of a difference in processing performance that is produced according to the characteristics of the video decoding apparatus even when the same profile is used. The maximum resolution and frame rate of a processible video may be determined according to the level value.

A tier, which is related to a restriction on the maximum bit rate, is a concept used because video is or is not compressed with high resolution and high quality depending on the application even at the same profile and the same level. That is, a tier is a regulation related to the memory 470 of the video decoding apparatus.

In the conventional method for setting a profile, a level, a tier, and the like, a level, a tier, and a profile are set to a single value for a sequence including one or more pictures. That is, in the conventional method, levels, tiers, and profiles are applied or set in units of one or more sequences.

Unlike such conventional methods, the present disclosure corresponds to an invention that further improves the efficiency of encoding and decoding by using a region having a size less than or equal to that of a picture as a reference unit in which a level and/or a tier is set. Hereinafter, the present disclosure will be described focusing on an embodiment in which a level rather than a tier is set for each region. It should be noted, however, that an embodiment of setting a tier for each region and an embodiment of setting both a level and a tier for each region may also be implemented through in the method proposed in the present disclosure.

Figure 5:
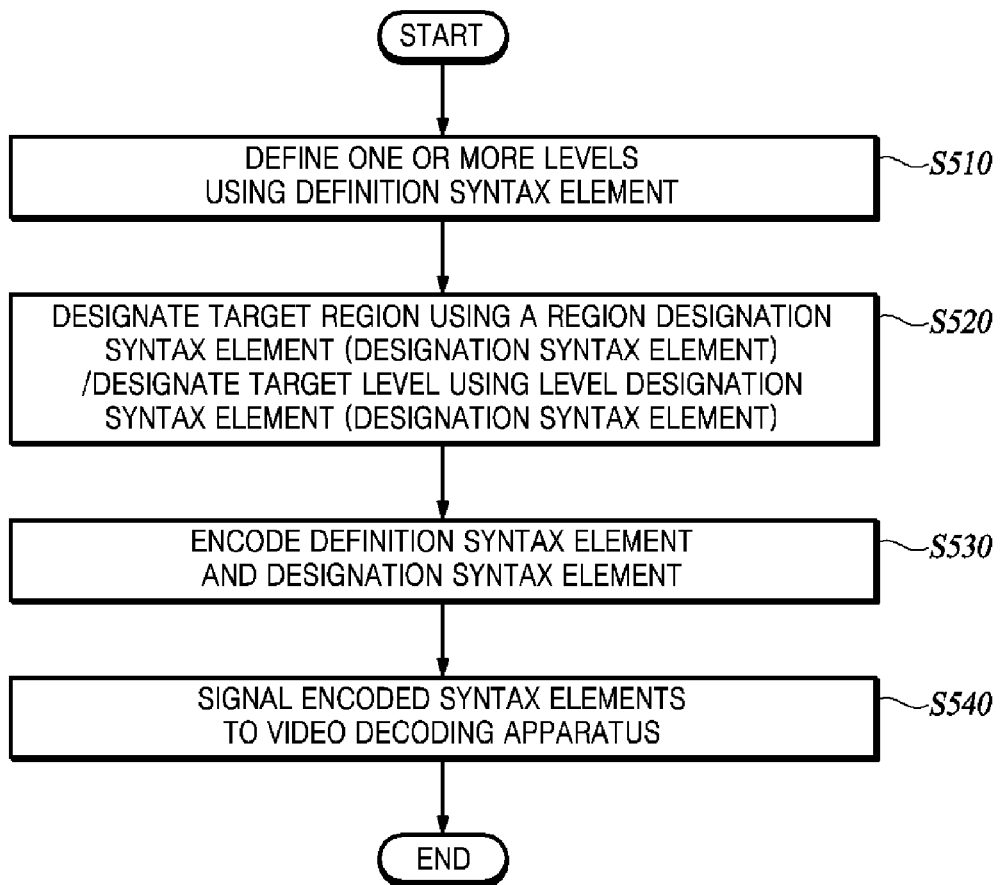
FIGS. 5 and 6 are flowcharts illustrating a method for setting a level or a tier implemented in a video encoding apparatus and a video decoding apparatus according to an embodiment of the present disclosure.
Figure 6:
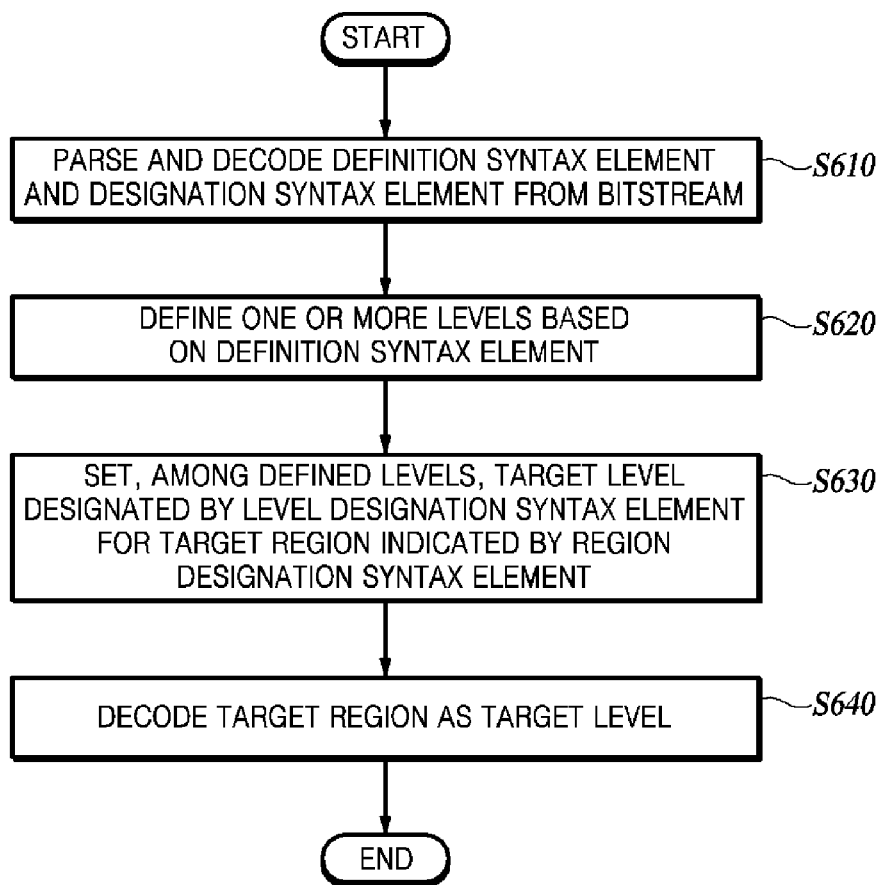

FIGS. 5 and 6 are flowcharts illustrating a method for setting a level or a tier implemented in a video encoding apparatus and a video decoding apparatus according to an embodiment of the present disclosure. Hereinafter, a basic embodiment of the present disclosure related to a level setting method will be described with reference to FIGS. 5 and 6.

As shown in FIG. 5, a control means included in the video encoding apparatus, that is, an encoding control means, defines one or more levels using a definition syntax element, which is a syntax element defining levels (S510). An example of the definition syntax element is shown in Table 1 below.

TABLE 1

| | Descriptor |
|---|---|
| pic_parameter_set_rbsp( ) { | |
| ... | ... |
|    num_base_tier_level_set_minus1 | |
|    for( i = 0; i <= num_base_tier_level_set_minus1; i++ ) { | |
|       base_tier_level_set_id[ i ] | |
|       base_tier_flag[ i ] | |
|       base_level_idc[ i ] | |
|    } | |
| ... | |
| } | |

In Table 1 above, num_base_tier_level_set_minus1 indicates a value obtained by subtracting 1 from the number of levels or tiers to be defined (that is, the number of levels to be defined), base_tier_level_set_id[i] indicates the ID of a level or tire set. base_tier_flag[i] indicates the value of the i-th tier, and base_level_idc[i] indicates the value of the i-th level.

While Table 1 shows only an example in which a set of levels or tiers to be defined is represented in the form of id, the set of levels or tiers to be defined may be represented in the form of an index (idx) (base_tier_level_set_idx) according to an embodiment. The definition syntax element may be defined at the PPS position as shown in Table 1, or may be defined at the positions of one or more of the PPS, SPS, VPS, and SEI.

When one or more levels are defined, the encoding control means designates a target region corresponding to a target of level setting and a target level, which is a level to be set in the target region, using a designation syntax element (S520).

The designation syntax element may include a syntax element for designating a target region and a syntax element for designating a target level. The designation syntax element for designating a target region may be referred to as a "region designation syntax element," and the designation syntax element for designating a target level may be referred to as a "level designation syntax element."

An example of the designation syntax elements (region designation syntax element and level designation syntax element) are shown in Table 2 below.

TABLE 2

| | Descriptor |
|---|---|
| tile_header( ) { <br>   tile_idx <br>   base_tier_level_set_id <br>   ... <br> } | |

In Table 2 above, tile_idx represents a region designation syntax element that designates the index of a target region implemented as a tile, and base_tier_level_set_id represents a level and tier designation syntax element indicating a level and tier to be applied or assigned to the target region indicated by tile_idx among predefined levels and tiers.

Table 2 shows a region designation syntax element and a level and tier designation syntax element on the assumption that the target region corresponds to a tile. However, as described above, the target region may correspond not only to a tile, but also to a slice, a tile group, or a slice segment. Accordingly, the region designation syntax element and the level and tier designation syntax element may be defined or designated in the header of a unit corresponding to the target region. For example, when the target region corresponds to a tile group, the region designation syntax element and the level and tier designation syntax element may be defined or designated in the tile group header. The same applies to the other tables presented below.

Once designation of the target region and the target level is completed, the encoder 150 encodes the definition syntax element and the designation syntax element (S530). The encoded syntax elements are included in a bitstream and signaled to the video decoding apparatus (S540).

As shown in FIG. 6, the decoder 410 first parses the definition syntax element and the designation syntax element from the bitstream signaled from the video encoding apparatus, and decodes the same (S610). As described above, the designation syntax element may include a region designation syntax element for designating a target region and a level designation syntax element for designating a target level.

The control means of the video decoding apparatus, that is, the decoding control means defines one or more levels based on the definition syntax element (S620). Once the one or more levels are defined, the decoding control means sets, among the defined levels, a target level designated by the level designation syntax element for the target region indicated by the region designation syntax element (S630).

When level setting is completed, the video decoding apparatus decodes the corresponding regions based on the levels set for the respective regions (S640).

As described above, the present disclosure is configured to set a level or tier for each region, rather than setting a single level or tier for a sequence composed of one or more pictures. Accordingly, encoding and decoding optimized for different picture qualities of the respective regions may be implemented.

In addition, the present disclosure may be used more usefully when all omnidirectional pictures, such as a 360 video, are recorded and an picture at a specific viewport and an picture at another viewport are to be decoded and played back with differential picture qualities or only the viewport picture is to be decoded and played back. An application example is shown in FIG. 7.

Figure 7:
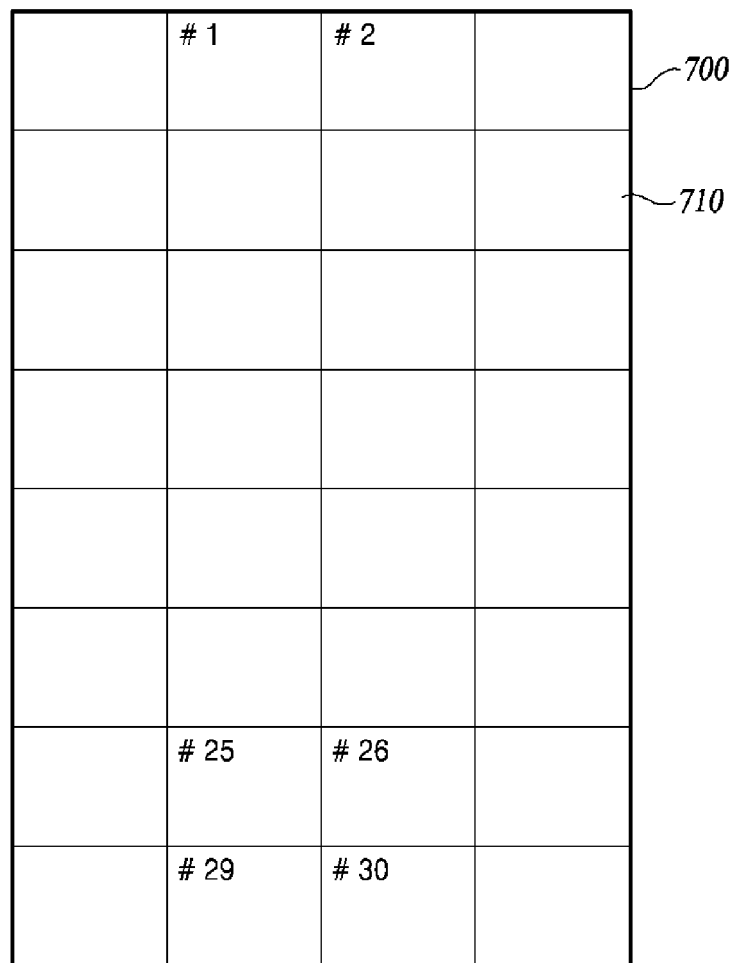
FIG. 7 is a diagram illustrating an embodiment of the present disclosure in which selective decoding is implemented for each region by setting different levels or tiers for respective target regions.

In FIG. 7, the entire region 700 of a 360 video may be composed of a plurality of regions 710. Among the regions 710, regions #1, #2, #25, #26, #29, and #30 represent viewport regions.

The encoding or decoding control means may set different levels or tiers for the viewport regions #1, #2, #25, #26, #29, and #30 and the other regions to encode or decode the viewport regions with a relatively high or low picture quality. Thereby, encoding and decoding with different picture qualities may be implemented.

The encoding or decoding control means may set the viewport regions #1, #2, #25, #26, #29, and #30 to be decoded to a separate level or tier to allow only the viewport regions #1, #2, #25, #26, #29, and #30 to be decoded and played back.

For example, suppose that the video decoding apparatus supports MPEG-4 AVC Main profile, Level 3 (L3), and thus decoding and playback at L3 or a lower level is possible. When the viewport region of a 360 video corresponds to level L3 and the other regions correspond to level L5, the level for the viewport region may be set to L3 to implement decoding and playback of only the viewport region.

Figure 8:
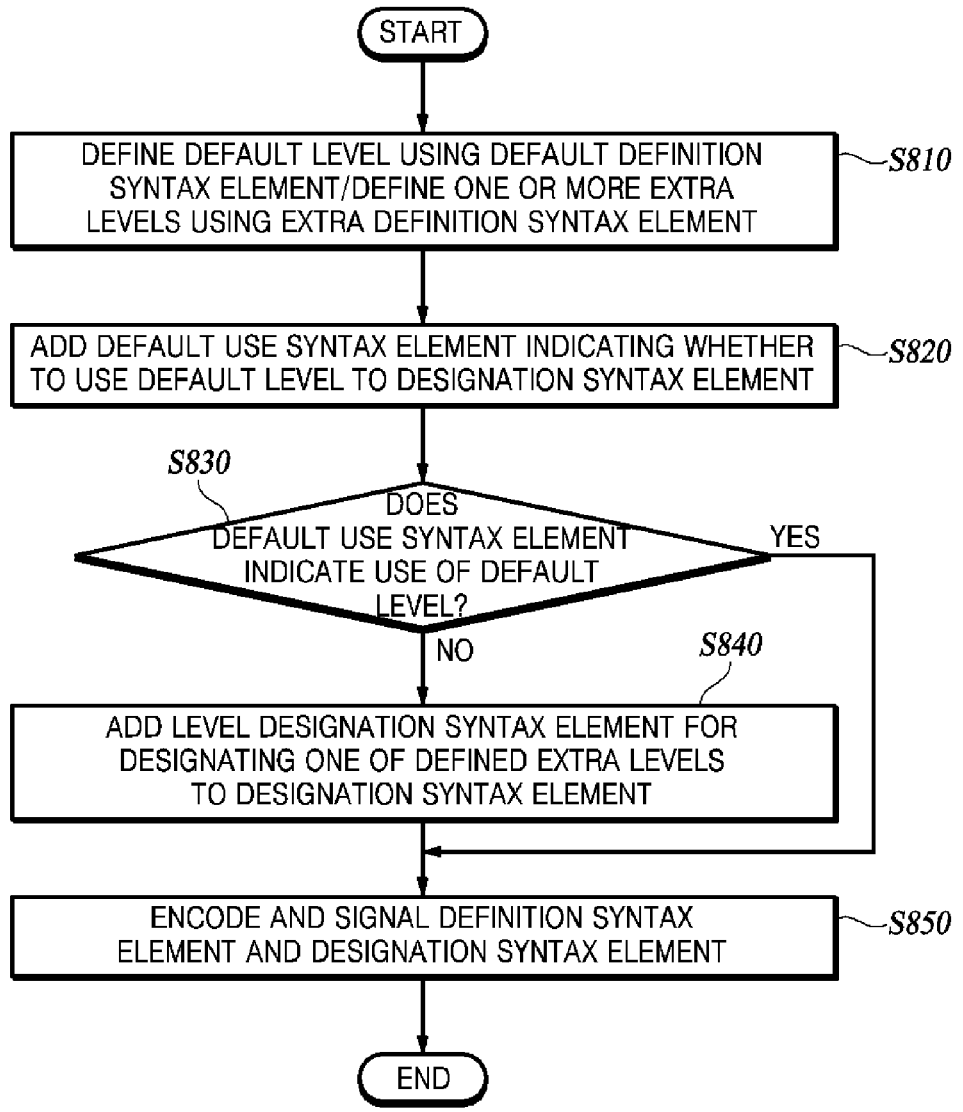
FIGS. 8 and 9 are flowcharts illustrating designation of a target level or target tier implemented in a video encoding apparatus and a video decoding apparatus according to an embodiment of the present disclosure.
Figure 9:
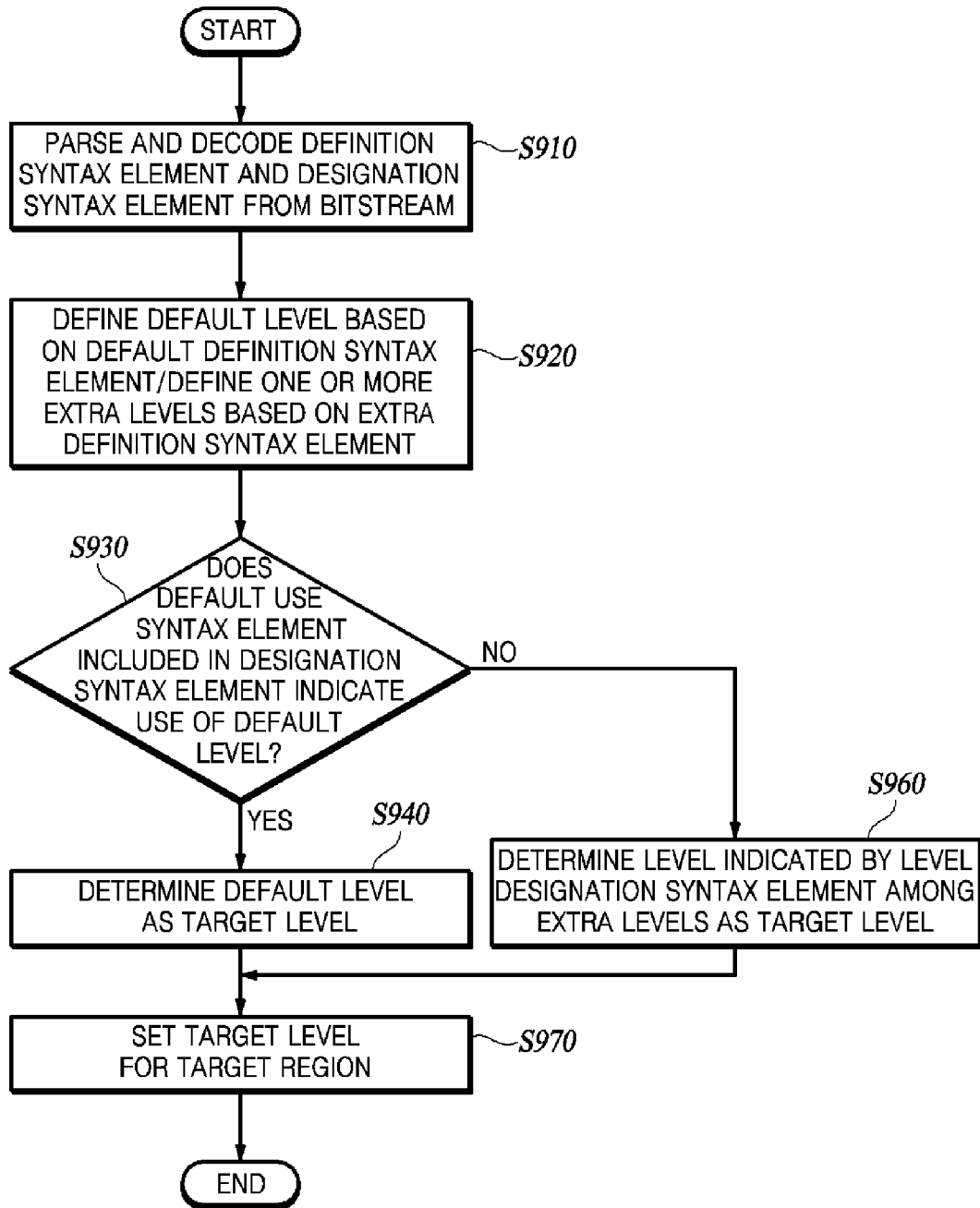

FIGS. 8 and 9 are flowcharts illustrating designation of a target level or target tier implemented in a video encoding apparatus and a video decoding apparatus according to an embodiment of the present disclosure. Hereinafter, an embodiment of the present disclosure for level designation will be described with reference to FIGS. 8 and 9.

The definition syntax element may include a syntax element for defining a default level (or a default definition syntax element) and a syntax element for defining one or more extra levels (or an extra definition syntax element). Here, the default level corresponds to a base level among the levels that may be designated for a target region, and the extra levels correspond to levels other than the default level.

An example of the default definition syntax element is shown in Table 3 below.

TABLE 3

| | Descriptor |
|---|---|
| seq_parameter_set_rbsp( ) { <br>   ... <br>   default_tier_flag <br>   default_level_idc <br>   ... <br> } | ... |

In Table 3 above, default_tier_flag corresponds to a default tier syntax element indicating the value of a default tier to be defined, and default_level_idc corresponds to a default level syntax element indicating the value of a default level to be defined.

An example of the extra definition syntax element is shown in Table 4 below.

TABLE 4

| | Descriptor |
|---|---|
| pic_parameter_set_rbsp( ) { | |
| ... | ... |
|   num_extra_tier_level_set | |
|   for( i = 0; i < num_extra_tier_level_set; i++ ) { | |
|     extra_tier_level_set_id[ i ] | |
|     extra_tier_flag[ i ] | |
|     extra_level_idc[ i ] | |
|   } | |
| ... | |
| } | |

In Table 4 above, num_extra_tier_level_set indicates the number of extra levels and extra tiers to be additionally defined, and extra_tier_level_set_id[i] indicates the IDs of the extra levels and the extra tiers to be additionally defined. extra_tier_flag[i] indicates the value of an extra tier to be additionally defined, and extra_level_idc[i] indicates the value of an extra level to be additionally defined.

While Table 4 shows only an example in which the set of levels or tiers to be additionally defined is represented in the form of id, the set of levels or tiers to be additionally defined may be represented in the form of an idx (extra_tier_level_set_idx) according to an embodiment. The same applies to the other tables presented below.

The encoding control means defines a default level using the default definition syntax element, and defines one or more extra levels using the extra definition syntax element (S810).

It should be determined which of the defined default level and the extra level is to be used as the target level. To perform the determination, the encoding control means includes a default use syntax element indicating whether to use the default level in the designation syntax element (S820).

When the default use syntax element included in the designation syntax element indicates use of the default level (S830), the video decoding apparatus is allowed to use the default level as the target level according to the indication of the default use syntax element. Accordingly, the encoding control means does not add a separate syntax element or information for determining the target level.

On the other hand, when the default use syntax element does not indicate the use of the default level (S830), the procedure of selecting a level to be used as a target level among one or more extra levels should be performed by the video decoding apparatus. A separate syntax element (level designation syntax element) for determining the target level is added to the designation syntax element (S840).

Table 5 shows an example of the default use syntax element and the level designation syntax element.

TABLE 5

| | Descriptor |
|---|---|
| tile_header( ) { | |
|   tile_idx | |
|   default_tier_level_flag | |
|   if ( !default_tier_level_flag ) | |
|     extra_tier_level_set_id | |
| ... | |
| } | |

In Table 5 above, default_tier_level_flag represents a default use syntax element implemented in the form of a flag, and extra_tier_level_set_id represents a level (tier) designation syntax element. The definition syntax element and the designation syntax element determined through these operations are encoded and signaled to the video decoding apparatus by the encoder 150 (S850).

Table 5 shows an example of a tile group, and a default use syntax element and/or a level (tier) designation syntax element may also be presented in headers corresponding to a slice, a tile group, and a slice segment, respectively.

As shown in FIG. 9, the decoder 410 parses the definition syntax element and the designation syntax element from the bitstream signaled from the video encoding apparatus, and decodes the same (S910).

The decoding control means defines a default level based on the default definition syntax element included in the definition syntax element, and defines one or more extra levels based on the extra definition syntax element included in the definition syntax element (S920).

The decoding control means determines whether the default use syntax element included in the designation syntax element indicates use of the default level (S930), and determines either the default level or the extra level as the target level based on the result of the determination.

Specifically, when the default use syntax element indicates the use of the default level, the decoding control means determines a predefined default level as the target level (S940), and sets the target level (default level) for the target region (S970).

On the other hand, when the default use syntax element does not indicate the use of the default level, the decoding control means determines the level indicated by the level designation syntax element among the predefined extra levels as the target level (S960), and set the target level (the indicated level among the extra levels) for the target region (S970). Here, the level designation syntax element is signaled from the video encoding apparatus only when the default use syntax element does not indicate the use of the default level.

Figure 10:
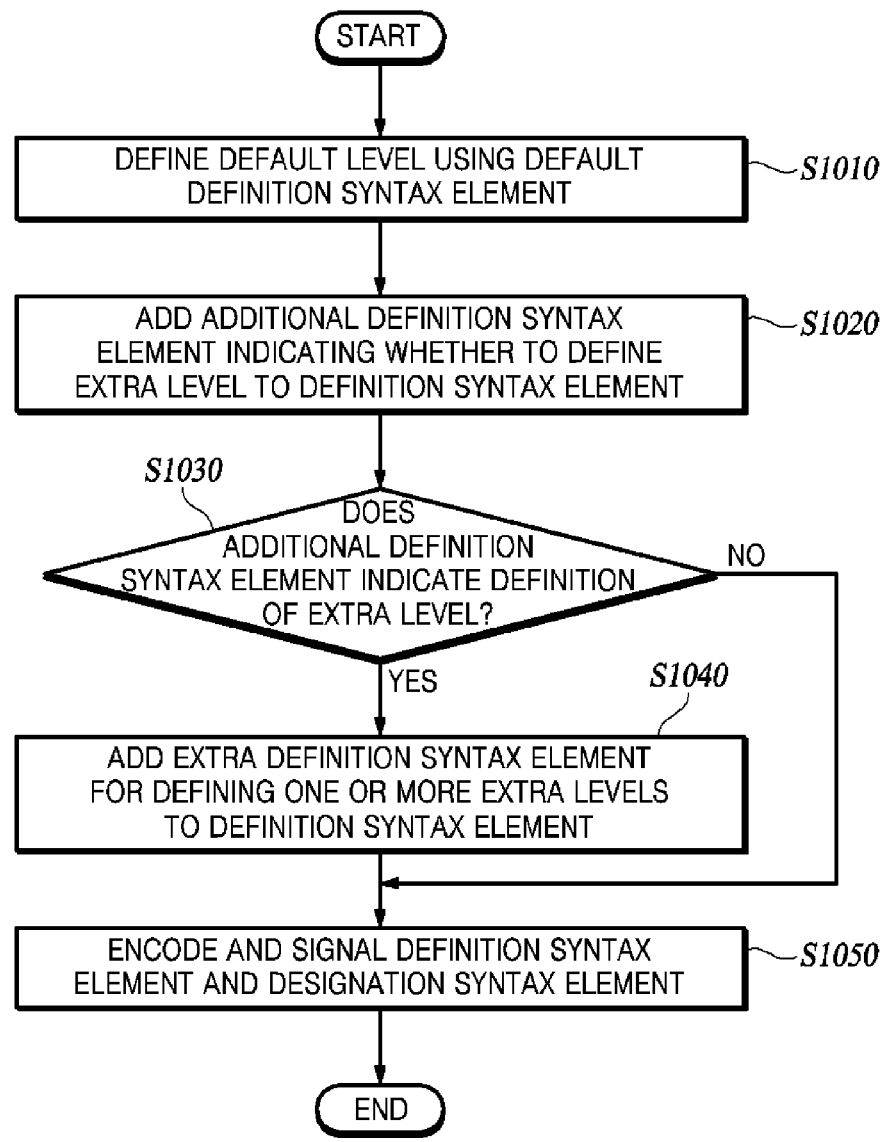
FIGS. 10 and 11 are flowcharts illustrating level or tier definition implemented in a video encoding apparatus and a video decoding apparatus according to an embodiment of the present disclosure.
Figure 11:
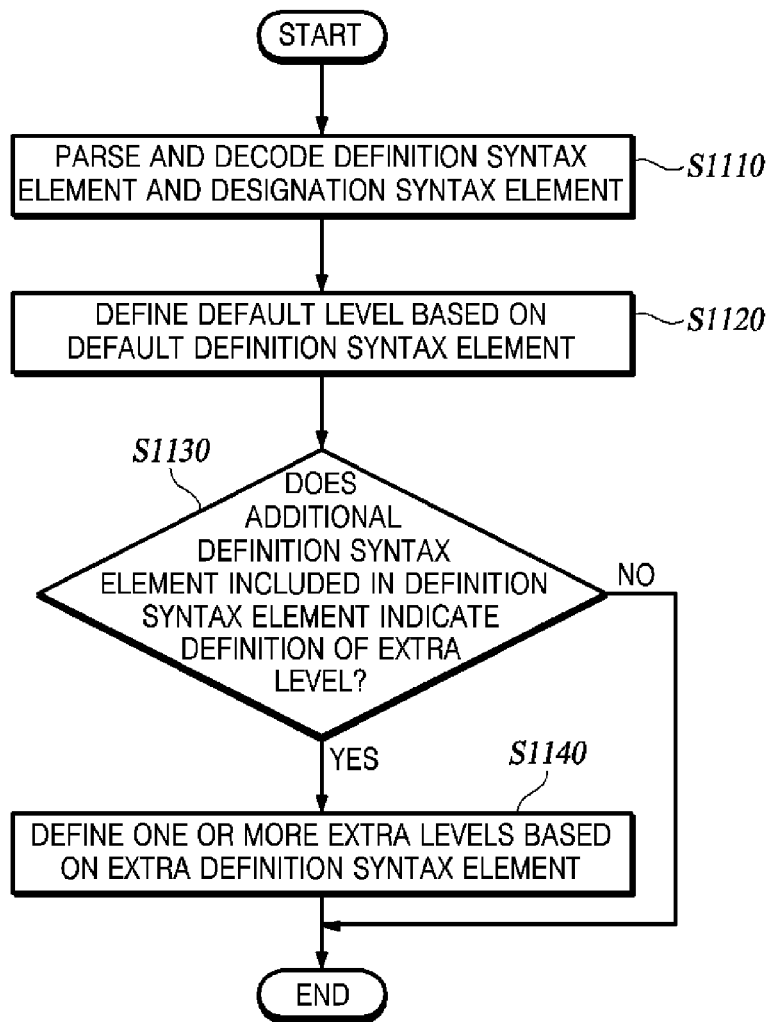

FIGS. 10 and 11 are flowcharts illustrating level or tier definition implemented in a video encoding apparatus and a video decoding apparatus according to an embodiment of the present disclosure. Hereinafter, an embodiment of the present disclosure for definition of a level or a tier will be described with reference to FIGS. 10 and 11.

The embodiment described with reference to FIGS. 8 and 9 relates to which of the two levels is to be designated for the target region on the assumption that the default level and the extra levels are defined separately, whereas the embodiments described with reference to FIGS. 10 and 11 relate selectively defining an extra level.

In this embodiment, the definition syntax element may include a syntax element for defining a default level (or default definition syntax element) and an additional definition syntax element indicating whether an extra level is defined. An example of the default definition syntax element and the additional definition syntax element is shown in Table 6 below.

TABLE 6

| | Descriptor |
|---|---|
| seq_parameter_set_rbsp( ) { | |
| ... | ... |
|   default_tier_flag | |
|   default_level_idc | |
|   extra_tier_level_flag | |
| ... | |
| } | |

In Table 6 above, default_tier_flag and default_level_idc correspond to a syntax element indicating a default tier value and a syntax element indicating a default level value, respectively, as described above. extra_tier_level_flag corresponds to an additional definition syntax element indicating whether an extra level is defined.

As shown in FIG. 10, the encoding control means defines a default level using the default definition syntax element (S1010), and further includes the additional definition syntax element in the definition syntax element to determine whether to define an extra level (S1020).

When the additional definition syntax element indicates definition of an extra level (S1030), the encoding control means further includes the extra definition syntax element in the definition syntax element to define one or more extra levels (S1040).

In contrast, when the additional definition syntax element does not indicate the definition of the extra level (S1030), the encoding control means does not additionally define any extra level. That is, the encoding control means does not include the extra definition syntax element in the definition syntax element.

An example of the additional definition syntax element and the extra definition syntax element is shown in Table 7 below.

The definition syntax element and the designation syntax element determined through the above-described processes are encoded and signaled to the video decoding apparatus by the encoder 150 (S1050).

As shown in FIG. 11, the decoder 410 parses the definition syntax element and the designation syntax element from a bitstream signaled from the video encoding apparatus, and decodes the same (S1110).

The decoding control means defines a default level based on the default definition syntax element included in the definition syntax element (S1120), and determines whether the additional definition syntax element included in the definition syntax element indicates definition of an extra level (S1130).

When the additional definition syntax element indicates definition of an extra level, the decoding control means defines one or more extra levels based on the extra definition syntax element (S1140). Here, the extra definition syntax element is signaled from the video encoding apparatus only when the additional definition syntax element indicates the definition of an extra level.

When the additional definition syntax element is implemented in a manner of indicating the number of extra levels, the decoding control means may define as many extra levels as the number indicated by the additional definition syntax

TABLE 7

| | Descriptor |
|---|---|
| pic_parameter_set_rbsp( ) {<br>  ...<br>  if ( extra_tier_level_flag ) {<br>    num_extra_tier_level_set_minus1<br>    for( i = 0; i <= num_extra_tier_level_set_minus1; i++ ) {<br>      extra_tier_level_set_id[ i ]<br>      extra_tier_flag[ i ]<br>      extra_level_idc[ i ]<br>    }<br>  }<br>  ...<br>} | ... |

As shown in Table 7, an extra level (extra_level_idc) or an extra tier (extra_tier_flag) is additionally defined only when the additional definition syntax element (extra_tier_level_flag) indicates the definition of an extra level or tier.

While Table 7 shows only an example in which a set of levels or tiers to be additionally defined is represented in the form of id, the set of levels or tiers to be defined may be represented in the form of an index (idx) (extra_tier_level_set_idx) according to an embodiment.

Table 7 shows an example in which an additional definition syntax element is implemented in the form of a flag to indicate whether or not an extra level is defined in a dichotomy. However, according to an embodiment, the additional definition syntax element may be implemented in the form of information indicating the number of extra levels to be defined n (where n is an integer greater than or equal to 0).

In an embodiment in which the additional definition syntax element indicates the number of extra levels, the encoding control means may not define an extra level for the additional definition syntax element indicating 0 (n=0), and may define extra levels as many as the number corresponding to the additional definition syntax element indicating n greater than or equal to 1 (n>1) (the number indicated by the additional definition syntax element).

element, and the above-described embodiment in which the default level or one of the extra levels is used as the target level according to the indication of the default use syntax element may be implemented.

In contrast, when the additional definition syntax element does not indicate the definition of the extra level, the decoding control means may terminate the level defining process without defining an extra level (because the extra definition syntax element is not signaled), and set the default level for the target region without the above-described process of determining whether to use the default level. Here, the default level corresponds to the target level.

According to an embodiment, the above-described process of determining whether to use the default level may be performed even when the additional definition syntax element does not indicate the definition of an extra level and thus no extra level is defined. For example, when the default use syntax element does not indicate the use of the default level, the encoding control means may signal the level actually applied to the target region in the designation syntax element, and the decoding control means may set the actually applied level (the signaled actual level or applied level) as the target level for the target region.

An embodiment in which the level actually applied to the target region, that is, the applied level, is determined as the target level may be implemented without determination regarding the additional definition syntax element. That is, the encoding control means signals only the default definition syntax element without the additional definition syntax element, and the decoding control means defines a default level based on the signaled default definition syntax element, and then determines a default use syntax element.

The decoding control means may set a predefined default level for the target region when the default use syntax element indicates use of the default level, and may set a signaled applied level for the target region when the default use syntax element does not indicate the use of the default level.

An example of the syntax elements employed in this embodiment is shown in Tables 8 and 9 below.

TABLE 8

|  | Descriptor |
|---|---|
| seq_parameter_set_rbsp( ) { <br> ... <br>    default_tier_flag <br>    default_level_idc <br> ... <br> } | ... |

As shown in Table 8, a default level and/or a default tier may be defined using default definition syntax elements (default_tier_flag, default_level_idc).

TABLE 9

|  | Descriptor |
|---|---|
| tile_header( ) { <br>   tile_idx <br>   default_tier_level_flag <br>   if ( !default_tier_level_flag ) { <br>     tier_flag <br>     level_idc <br>   } <br>   ... <br> } |  |

As shown in Table 9, whether to use a default level and/or a tier may be determined by the default use syntax element (default_tier_level_flag). When the default use syntax element indicates use of the default level and/or tier, a predefined default level and/or default tier may be set for the target region. In contrast, when the default use syntax element does not indicate the use of the default level and/or tier, the applied level (level_idc) and/or the applied tier (tier_flag) may be set for the target region for setting of the level and/or tier.

Screen resolutions of mobile devices such as smartphones and tablets and digital TVs are increasing, and the size of display devices are gradually increasing. To support this trend, high-definition video should be transmitted quickly. Fortunately, communication speed is increasing, and video compression technologies are also being developed to provide high-definition video. In addition, parallelization technology for use in compression and reconstruction of pictures is being developed to provide high-definition video. The parallelization technology enables a large amount of computation to be processed at once by using multiple processors simultaneously. However, data to be processed in parallel should not affect each other.

A video is composed of a plurality of pictures, and each picture is split into a plurality of slices or tiles and compressed. Whether the split slices/tiles are independent affects the parallelization of video compression and reconstruction. In other words, when the split slices/tiles have independence, video compression and reconstruction may be processed in parallel. However, when split slices/tiles have dependence, the affecting slices/tiles should be processed first, and then the affected slices/tiles should be processed. Accordingly, it is difficult to perform parallel processing.

The present disclosure proposes how a video encoding apparatus should configure and transmit information on the split pictures in order to perform parallel processing or distributed processing of the split pictures.

Methods of splitting a picture have been briefly described above. Hereinafter, the methods will be described in more detail.

The first method is to split a picture into slices, and thus a picture may be composed of one or more slices. A picture is split into CTUs to enable encoding and decoding. In this case, the picture may be split in order of raster scan.

A slice may be composed of one or more slice segments. There are two types of slice segments: an independent slice segment and a dependent slice segment. The independent slice segment is not dependent on other slice segments during inter-prediction, intra-prediction, coding mode, and entropy coding, and there is header information about the independent slice segment. On the other hand, the dependent slice segment is dependent on a preceding independent slice segment during inter-prediction, intra-prediction, coding mode and entropy coding. The dependent slice segment refers to most of the header information about an independent slice segment on which the dependent slice segment is dependent, and only a part of the header information is transmitted as separate header information.

Figures 12, 13:
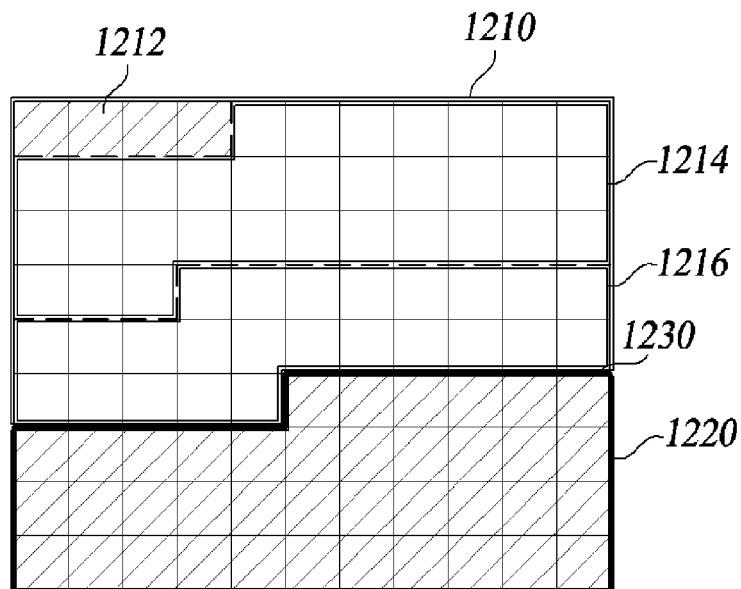
FIG. 12 is a diagram illustrating an example of slices constituting one picture.
FIG. 13 is a diagram illustrating an example of tiles constituting one picture.

FIG. 12 is a diagram illustrating an example of slices constituting one picture.

In FIG. 12, one picture has two slices 1210 and 1220. A first slice 1210 consists of one independent slice segment 1212 and two dependent slice segments 1214 and 1216. A second slice 1220 consists of one independent slice segment. There is a slice boundary 1230 between the slices. However, there may be only a horizontal axis boundary as the slice boundary 1230. For reference, like the second slice 1220, one slice may consist of only independent slice segments.

Tables 10 and 11 below show the syntax for the slices.

Specifically, Table 10 shows an example of the PPS. The PPS includes a flag (dependent_slice_segments_enabled_flag) indicating whether a dependent slice segment is used in the picture.

TABLE 10

| pic_parameter_set_rbsp( ) { <br>   pps_pic_parameter_set_id <br>   pps_seq_parameter_set_id <br>   dependent_slice_segments_enabled_flag <br>   ... <br> } |
|---|

Table 11 below shows an example of header information about a slice segment.

TABLE 11

| slice_segment_header( ) { <br>   first_slice_segment_in_pic_flag <br>   if( nal_unit_type >= BLA_W_LP && nal_unit_type <= RSV_IRAP_VCL23 ) <br>     no_output_of_prior_pics_flag <br>   slice_pic_parameter_set_id |
|---|

TABLE 11-continued

```
   if( !first_slice_segment_in_pic_flag ) {
     if( dependent_slice_segments_enabled_flag )
       dependent_slice_segment_flag
     slice_segment_address
   }
   if( !dependent_slice_segment_flag ) {
     ...
   }
   if(tiles_enabled_flag | | entropy_coding_sync_enabled_flag) {
     num_entry_point_offsets
     if( num_entry_point_offsets > 0 ) {
       offset_len_minus1
       for( i = 0; i < num_entry_point_offsets; i++ )
         entry_point_offset_minus1[ i ]
     }
   }
   ...
}
```

The first slice segment in the picture is unconditionally an independent slice segment. Accordingly, the header information about a slice segment includes a flag indicating whether the slice segment is the first slice segment (first_slice_segment_in_pic_flag), a flag (dependent_slice_segment_flag) for slice segments other than the first slice segment, which indicates whether the slice segment is an independent slice segment or a dependent slice segment, and an address of the slice segment (slice_segment_address).

The second method is to split a picture into one or more tiles and group one or more tiles into one tile group. As in the case of slices, a picture may be composed of one or more tiles and/or tile groups. When a picture is split by a specific size/unit, a tile represents a form split into a plurality of columns and rows based on a specific unit. That is, the size of one tile is a multiple of the specific unit. For example, when the specific unit is CTU, one picture is split into CTUs, and a tile is formed by splitting the picture into a plurality of columns and rows of CTUs. The tile can be independently encoded and decoded. A tile is not dependent on other tiles in intra-prediction and entropy coding. That is, intra-prediction and entropy coding of a tile are always independently performed. However, in inter-prediction, an encoder issue may be raised or related information may be transmitted in the form of a PPS, a tile group header (TGH), or supplement enhancement information (SEI). In the in-loop filtering of a tile, dependence of the tile on another tile may be controlled with a flag of PPS and/or TGH.

FIG. 13 is a diagram illustrating an example of tiles constituting one picture.

In FIG. 13, a picture is split into 3 columns and 3 rows, and thus consists of 9 tiles. The tiles constituting the picture may be encoded or decoded in order of raster scan, and the multiple CTUs constituting a tile may also be encoded or decoded in order of raster scan. The numbers shown in FIG. 13 are CTU numbers, and may be the order of raster scan in which encoding or decoding is performed.

Column boundaries 1310 and 1315 are present between vertically split tiles, and row boundaries 1320 and 1325 are present between horizontally split tiles. Tiles may be split uniformly or individually depending on the splitting method.

Table 12 below shows an example of the syntax for tiles. Specifically, Table 12 shows an example of PPS.

TABLE 12

```
pic_parameter_set_rbsp( ) {
  tiles_enabled_flag
  if( tiles_enabled_flag ) {
```

TABLE 12-continued

```
    num_tile_columns_minus1
    num_tile_rows_minus1
    uniform_spacing_flag
    if( !uniform_spacing_flag ) {
      for( i = 0; i < num_tile_columns_minus1; i++ )
        column_width_minus1[ i ]
      for( i = 0; i < num_tile_rows_minus1; i++ )
        row_height_minus1[ i ]
    }
    loop_filter_across_tiles_enabled_flag
  }
```

The PPS includes a flag (tiles_enabled_flag) indicating on/off of the tile function. When the flag is on, multiple syntaxes capable of specifying the size of a tile are additionally included in the PPS. For example, when the flag is on, the PPS may include a syntax (num_tile_columns_minus1) indicating the number of tiles split based on the column boundaries of the picture minus 1, a syntax (num_tile_rows_minus1) indicating the number of tiles split based on the row boundaries of the picture minus 1, and a flag (uniform_spacing_flag) indicating that the tiles are uniformly split horizontally and vertically. When the tiles are not uniformly split horizontally and vertically (uniform_spacing_flag=off), the PPS may further include a syntax (column_width_minus1) indicating the width of each tile based on the column boundary and a syntax (row_height_minus1) indicating the height of each tile based on the row boundary. Finally, a flag (loop_filter_across_tiles_enabled_flag) indicating whether a loop filter is executed in an inter-tile boundary region may also be included in the PPS.

Additionally, a motion constrained tile set (MCTS) describing whether to perform referencing in inter-prediction between different tiles may be included in a supplement enhancement information (SEI) message. Table 13 below shows an example of the MCTS syntax.

TABLE 13

```
temporal_motion_constrained_tile_sets( payloadSize ) {
  mc_all_tiles_exact_sample_value_match_flag
  each_tile_one_tile_set_flag
  if( !each_tile_one_tile_set_flag ) {
    limited_tile_set_display_flag
    num_sets_in_message_minus1
    for( i = 0; i <= num_sets_in_message_minus1; i++ ) {
      mcts_id[ i ]
      if( limited_tile_set_display_flag )
        display_tile_set_flag[ i ]
      num_tile_rects_in_set_minus1[ i ]
      for( j = 0; j <= num_tile_rects_in_set_minus1[ i ]; j++ ) {
        top_left_tile_index[ i ][ j ]
        bottom_right_tile_index[ i ][ j ]
      }
      if( !mc_all_tiles_exact_sample_value_match_flag )
        mc_exact_sample_value_match_flag[ i ]
    ...
  } else {
    ...
  }
}
```

The MCTS includes information such as the number of tile sets present in one picture (num_sets_in_message_minus1), the number of tile rectangles that constitute each tile set (num_tile_rects_in_set_minus1), and the indexes of a tile that constitutes each tile rectangle (top_left_tile_index[i][j], bottom_right_tile_index[i][j]).

FIG. 14 is a diagram illustrating an example of an MCTS included in one picture.

According to FIG. 14, a picture is composed of 48 tiles. The numbers shown in FIG. 14 indicate tile indexes. The picture includes one tile set 1410, and the one tile set includes two tile rectangles. The first tile rectangle 1420 includes 3 tiles, wherein the index of the top left tile is 16, and the index of the bottom right tile is 32. The second tile rectangle 1430 includes 9 tiles, where the index of the top left tile is 21, and the index of the bottom right tile is 39. Tiles belonging to the same tile set are allowed to refer to each other in inter-prediction.

The MCTS of FIG. 14 may be represented with the MCTS syntax of Table 13 as follows:
num_sets_in_message_minus1=0;
mcts_id[0]=0;
num_tile_rects_in_set_minus1[0]=1;
{top_left_tile_index[0][0]=16, bottom_right_tile_index[0][0]=32};
{top_left_tile_index[0][1]=21, bottom_right_tile_index[0][1]=39}.

Slices are mainly used for parallel processing of a picture, and information related to encoding/decoding is carried in the slice header. On the other hand, in the case of tiles, there is no separate header, and some of the information related to the tiles is carried in the supplement enhancement information (SEI) message.

While the boundary of slices is determined only along the horizontal axis, boundaries of tiles may be determined not only along the horizontal axis but also along the vertical axis. As the capacity and performance of the video encoding/decoding apparatus for bandwidth processing are significantly improved, the conventional row-based processing method as in the case of slices may limit parallel processing and quality improvement. Accordingly, the present disclosure proposes various methods to supplement the characteristics of slices while employing tiles for parallel processing and distributed processing. Specifically, the present disclosure proposes how to configure a split picture with tiles and how to transmit information about the tiles.

As described above, a 'tile' according to the present disclosure may also be obtained by splitting one picture into rows and columns. However, a tile and/or tile group according to the present disclosure may be a basic unit constituting a network abstraction layer (NAL), and may be dependent on or independent from another tile and/or tile group, like a slice segment. In addition, the tile/tile group according to the present disclosure may include various kinds of information.

Figure 15:
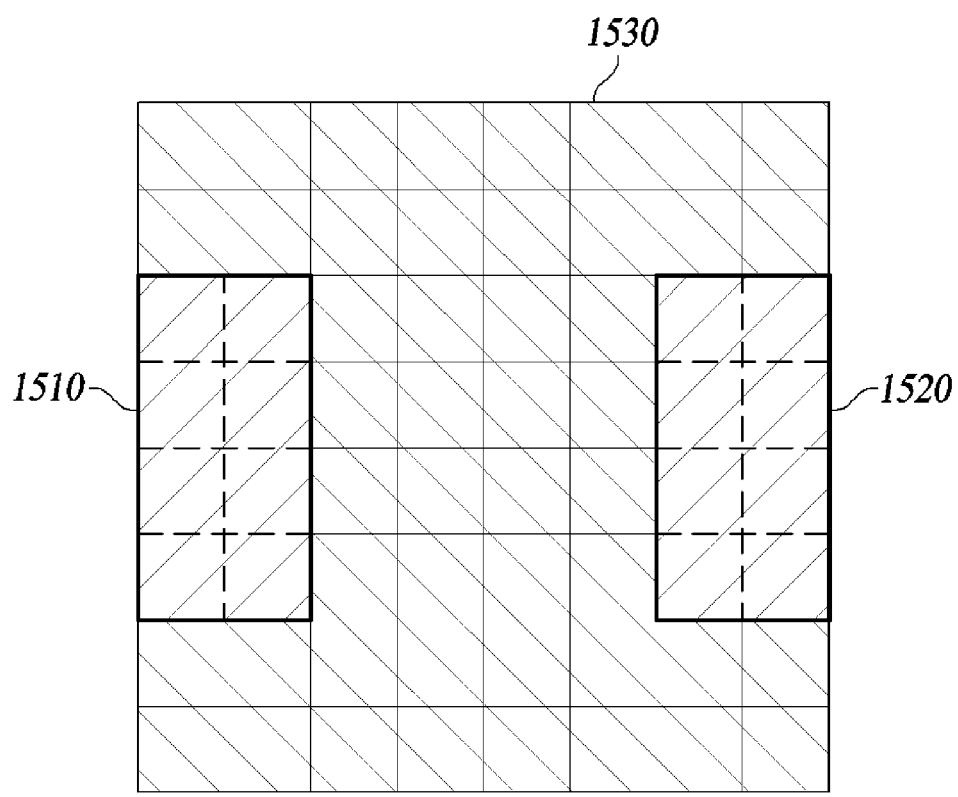
FIG. 15 is a diagram illustrating a tile constituting one picture according to an embodiment of the present disclosure.

FIG. 15 is a diagram illustrating a tile constituting one picture according to an embodiment of the present disclosure.

The one picture may be split into multiple tiles. When tiles depending on each other among the split tiles form a square, they may be configured as one region (i.e., tile set), and tile sets depending on each other may be configured as one tile group. That is, one or more tile sets or tiles included in one tile group may be dependent on each other, and there is no dependency between tile groups. In other words, independence of each tile group is ensured. Here, in the present disclosure, the entire regions forming rectangles are defined as viewport regions (or regions of interest (ROIs)). In addition, the remaining region excluding the rectangular regions, that is, the viewport region configured in the one picture may be separately configured. In the present disclosure, this region is defined as a background region. The tiles that constitute the background region may also have dependence or independence.

In FIG. 15, one picture includes viewport regions 1510 and 1520 and a background region 1530. The viewport regions 1510 and 1520 and the background region 1530 are each composed of one or more tiles and indicate specific regions in the picture. For example, the viewport regions 1510 and 1520 may be regions in which a user's viewpoint remains when a 360 video is provided, or regions in which an object in the picture is present. The viewport regions 1510 and 1520 are generally configured in a rectangular shape. On the other hand, the background region 1530 is a region different from the viewport regions 1510 and 1520 in the one picture, and may not be rectangular. In FIG. 15, as in the case of the slice segment of FIG. 12, tiles dependent on each other are indicated by a dotted line, and tiles which are not dependent on each other, that is, which are independent from each other are indicated by a solid line. Accordingly, the tiles constituting the viewport regions 1510 and 1520 have dependency on each other, and may thus affect each other during inter-prediction or/and filtering. On the other hand, the tiles constituting the background region 1530 have no dependency on each other, and accordingly independently operate during intra-prediction, inter-prediction, entropy coding, and filtering. In the following, tiles dependent on each other are indicated by a dotted line, and tiles independent from each other are indicated by a solid line. For reference, while it is illustrated in FIG. 15 that both the viewport regions and the background region are present in one picture, they are not necessarily all present. That is, one picture may be composed of only the viewport regions or the background region.

Hereinafter, various embodiments relating to transmitting information about tiles constituting one picture will be described in detail.

First Embodiment

According to the first embodiment of the present disclosure, the video encoding apparatus stores picture splitting information and information about the independence of tiles constituting the picture in a PPS, stores tile id information in a tile header, and transmits the information to the video decoding apparatus. In the first embodiment, all tiles are independent during intra-prediction and entropy coding. However, during inter-prediction and filtering, tiles are independent or dependent according to independence information about the tiles stored in the PPS.

Table 14 below shows the PPS according to the first embodiment.

TABLE 14

```
pic_parameter_set_rbsp( ) {
    ...
    multiple_tiles_in_pic_flag
    ...
    if( multiple_tiles_in_pic_flag ) {
        num_tile_columns_minus1
        num_tile_rows_minus1
        uniform_spacing_flag
        if( !uniform_spacing_flag ) {
            for( i = 0; i < num_tile_columns_minus1; i++ )
                column_width_minus1[ i ]
            for( i = 0; i < num_tile_rows_minus1; i++ )
                row_height_minus1[ i ]
        }
        all_independent_tile_flag
        if( !all_independent_tile_flag ) {
            num_tile_groups_in_pic_minus1
            for( i = 0; i < num_tile_groups_in_pic_minus1; i++ ) {
                tile_group_id[ i ]
```

TABLE 14-continued

```
       num_tile_sets_in_tg_minus1
       for( j = 0; j < num_tile_sets_in_tg_minus1; j++ ) {
          tile_set_id[ i ][ j ]
          topleft_tile_id[ i ][ j ]
          bottomright_tile_id[ i ][ j ]
       }
     }
    }
   }
  }
 }
```

According to the first embodiment, the PPS may include a flag (multiple_tiles_in_pic_flag) indicating whether one picture is split into multiple tiles and a flag (all_independent_tile_flag) indicating whether all tiles have independence. Here, the flag (multiple_tiles_in_pic_flag) indicating whether one picture is split into multiple tiles may also indicate whether the picture is composed of one tile, and a flag indicating whether the picture is composed of one tile (single_tile_in_pic_flag) may be selectively used. For example, when the value of multiple_tiles_in_pic_flag is "1," this means that the picture is split into multiple tiles. When the value of multiple_tiles_in_pic_flag is "0," this means that the picture is composed of one tile.

Also, the flag (all_independent_tile_flag) indicating whether all tiles have independence may be a flag indicating whether there is a tile group indicating dependency between tiles in one picture. For example, when the value of all_independent_tile_flag is "1," this means that one tile constitutes one tile group because all tiles in one picture are independent. When the value of all_independent_tile_flag is "0," there are tiles having dependency on each other in one picture, and accordingly multiple tiles may belong to one tile group. That is, this means that at least one tile group including multiple tiles is present in the picture. Alternatively, when one tile constitutes one tile group, the flag may be replaced with a flag (single_tile_per_tile_group_flag) indicating that each tile group consists of a tile.

When tiles have dependency on each other, a syntax (num_tile_groups_in_pic_minus1) indicating the number of tile groups belonging to one picture, a syntax (tile_group_id) indicating the ID of a tile group, and a syntax (num_tile_sets_in_tg_minus1) indicating the number of tile sets belonging to one tile group, a syntax (tile_set_id) indicating the ID of a tile set, a syntax (topleft_tile_id) indicating the ID of the top left tile constituting the rectangular region of the tile set, and a syntax (bottomright_tile_id) indicating the ID of the bottom right tile constituting the rectangular region of the tile set. Here, IDs of tile groups as many as the value of the syntax (num_tile_groups_in_pic_minus1) indicating the number of tile groups are displayed. A flag (explicit_tile_group_id_flag) for determining whether to explicitly transmit the ID of a tile group may be additionally provided, and the tile group ID may be transmitted according to the value of the flag. For example, when the value of explicit_tile_group_id_flag is "1," IDs of tile group as many as the value of the syntax (num_tile_groups_in_pic_minus1) indicating the number of tile groups may be displayed. When the value of explicit_tile_group_id_flag is "0," no tile group ID may be transmitted.

In the first embodiment, tiles constituting one rectangular region between the viewport regions in a picture may be defined as one tile set. When multiple tile sets depend on each other, they may be defined as one tile group.

Table 15 below shows the tile header according to the first embodiment.

TABLE 15

```
tile_header( ) {
   tile_id
   ...
}
```

The tile header according to the first embodiment includes a corresponding tile id (tile_id).

The information about the tile group and the tile set is included in the PPS. As shown in Table 16 below, information about whether the corresponding tiles have independence and information about the tile group and the tile set may also be included in the tile header.

TABLE 16

```
tile_header( ) {
   tile_id
   if ( !all_independent_tile_flag )
      independent_tile_flag (default: on)
   if( !independent_tile_flag ) {
      tile_group_id
      tile_set_id
   }
   ...
}
```

Specifically, the tile header may include at least one of a flag (independent_tile_flag) indicating whether a corresponding tile is dependent, a syntax (tile_group_id) indicating the ID of a tile group set in the PPS for the tile, and a syntax (tile_set_id) indicating the ID of a tile set that is set in the PPS for the tile.

According to the first embodiment, tiles having the same tile group ID (tile_group_id) and tile set ID (tile_set_id) are dependent on each other during inter-prediction and filtering. That is, the video encoding/decoding apparatus determines reference/use by checking the ID of the tile group and the ID of the tile set during inter-prediction and filtering. Optionally, the video encoding/decoding apparatus may reference/use by checking only the ID of the tile group during inter-prediction and filtering.

Figure 16:
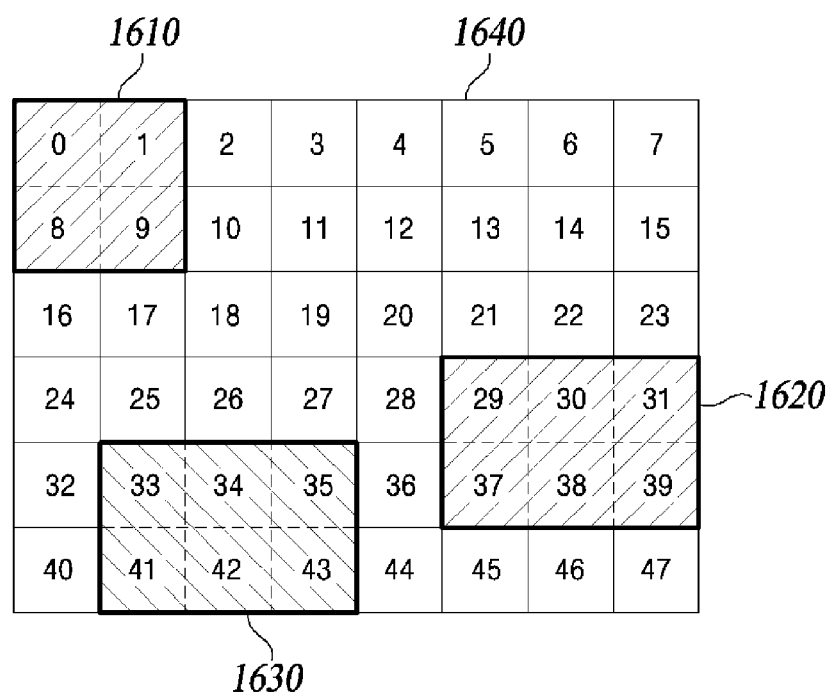
FIG. 16 is a diagram illustrating an example of a picture according to first and second embodiments of the present disclosure.

FIG. 16 is a diagram illustrating an example of a picture according to first and second embodiments of the present disclosure.

Referring to FIG. 16, the picture is composed of 48 tiles, and tiles are shown. The picture includes a background region 1640 and a viewport region 1610, 1620, and 1630. The tiles constituting the background region 1640 are independent and are indicated by solid lines. However, the tiles constituting the viewport regions 1610, 1620, and 1630 are dependent on each other and are indicated by dotted lines.

In FIG. 16, it is assumed that the viewport region 1610, 1620, and 1630 is composed of three tile sets 1610, 1620, and 1630, and two tile sets 1610 and 1620 are configured as one tile group. In this case, there are two tile groups in the viewport region.

The picture of FIG. 16 may be represented with the PPS according to the first embodiment as follows:

```
all_independent_tile_flag = off;
num_tile_groups_minus1 = 1;
{tile_group_id = 0;
   num_tile_sets_minus1 = 1,
   tile_set_id = 0, topleft_tile_id = 0, bottomright_tile_id = 9,
   tile_set_id = 1, topleft_tile_id = 29, bottomright_tile_id = 39};
{tile_group_id = 1;
```

-continued

```
num_tile_sets_minus1 = 0,
  tile_set_id = 0, topleft_tile_id = 33, bottomright_tile_id = 43};
```

Table 17 below shows a tile header for some tiles of FIG. 16 according to the first embodiment.

TABLE 17

| tile_id | 0 | 1 | 2 | 8 | 31 | 33 | 39 | 43 |
|---|---|---|---|---|---|---|---|---|
| independent_tile_flag | 0 | 0 | 1 | 0 | 0 | 0 | 0 | 0 |
| tile_group_id | 0 | 0 | — | 0 | 0 | 1 | 0 | 1 |
| tile_set_id | 0 | 0 | — | 0 | 1 | 0 | 1 | 0 |

For example, in FIG. 16, a tile having tile_id set to 8 has a boundary marked with a dotted line and is thus dependent. Accordingly, independent_tile_flag, a flag indicating whether the tile is independent, indicates 0. In addition, the tile header indicates that the tile belongs to tile group 0 between two tile groups 0 and 1 and belongs to tile set 0 between two tile sets 0 and 1. As another example, a tile with a tile ID of 43 has a part marked with a dotted line and is thus dependent. Accordingly, independent_tile_flag, a flag indicating whether the tile is independent, indicates 0. In addition, since the tile belongs to a tile group different from the tile group of the tile having tile_id set to 8, tile_group_id indicates 1 for this tile. Since there is only one tile set, tile_set_id is set to 0.

In FIG. 16, tiles constituting the background region 1640 are all independent. Accordingly, information about the background region 1640 may be indicated by the flag indicating whether the one picture is split into multiple tiles and the flag indicating whether all the tiles have independence. Hereinafter, an embodiment representing a case where the tiles constituting the background region 1640 have dependency on each other will be described.

Figure 17:
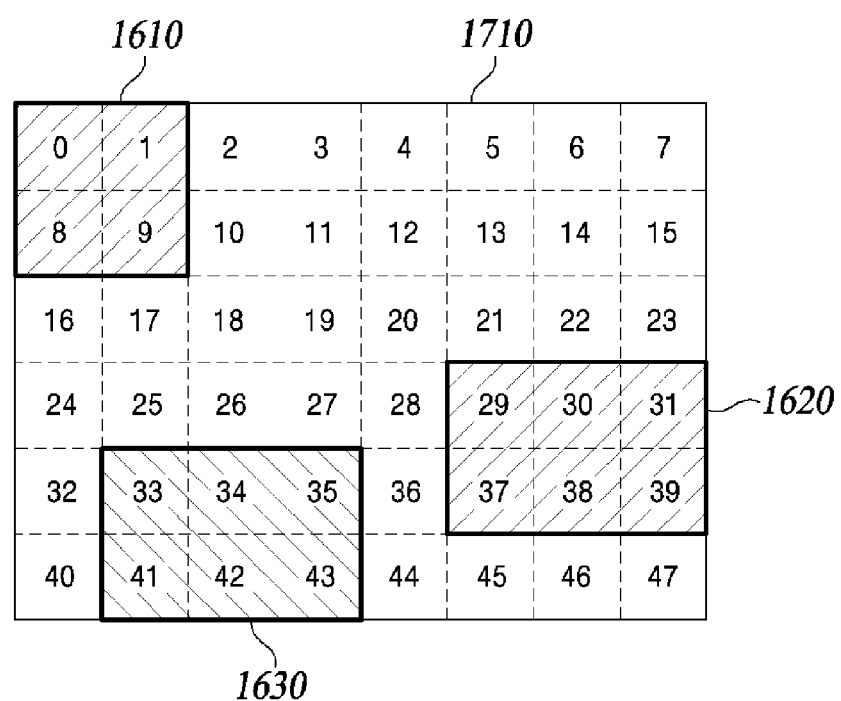
FIG. 17 is a diagram illustrating another example of a picture according to the first and second embodiments of the present disclosure.

FIG. 17 is a diagram illustrating another example of a picture according to the first embodiment of the present disclosure.

FIG. 17 is the same as FIG. 16 except that the tiles constituting the background region 1710 are dependent. When the tiles constituting the background region 1710 is dependent, information about a tile group and a tile set is included as in the case of the viewport region.

The picture of FIG. 17 may be represented with the PPS according to the first embodiment as follows:

```
all_independent_tile_flag = off;
num_tile_groups_minus1 = 2;
{tile_group_id = 0;
  num_tile_sets_minus1 = 1,
    tile_set_id = 0, topleft_tile_id = 0, bottomright_tile_id = 9
    tile_set_id = 1, topleft_tile_id = 29, bottomright_tile_id = 39};
{tile_group_id = 1;
  num_tile_sets_minus1 = 0,
    tile_set_id = 0, topleft_tile_id = 33, bottomright_tile_id = 43};
{tile_group_id = 2;
  num_tile_sets_minus1 = 0,
    tile_set_id = 255 (reserved, bg_tile)};
```

For the background region 1710, tile_group_id is 2, there is one tile set, and the ID of the tile set is 255. In the case of the background region 1710, the ID of the tile set may be preset to 255. Here, 255 represents a predetermined number, and the ID is not limited to 255. That is, when the ID of the tile set is 255, a region constituting the tile set does not need to be separately indicated because the region is the background region.

Table 18 below shows a tile header for some tiles of FIG. 17 according to the first embodiment.

TABLE 18

| tile_id | 0 | 1 | 2 | 3 | 31 | 33 | 39 | 45 |
|---|---|---|---|---|---|---|---|---|
| independent_tile_flag | 0 | 0 | 0 | 0 | 0 | 0 | 0 | 0 |
| tile_group_id | 0 | 0 | 2 | 2 | 0 | 1 | 0 | 2 |
| tile_set_id | 0 | 0 | 255 | 255 | 1 | 0 | 1 | 255 |

For example, in FIG. 17, a tile having tile_id set to 3 has a boundary marked with a dotted line and is thus dependent. Accordingly, independent_tile_flag, a flag indicating whether the tile is independent, indicates 0. In addition, since the tile belongs to tile group 2 among three tile groups 0, 1, and 2 and belongs to the background region, tile_set_id may indicate 255 in the tile header.

The picture of FIG. 17 may be represented in another way using the PPS according to the first embodiment as follows:

```
all_independent_tile_flag = off;
num_tile_groups_minus1 = 2;
{tile_group_id = 0;
  num_tile_sets_minus1 = 1,
    tile_set_id = 0, topleft_tile_id = 0, bottomright_tile_id = 9,
    tile_set_id = 1, topleft_tile_id = 29, bottomright_tile_id = 39};
{tile_group_id = 1;
  num_tile_sets_minus1 = 0,
    tile_set_id = 0, topleft_tile_id = 33, bottomright_tile_id = 43};
{tile_group_id = 255 (reserved, bg_tile)};
```

Here, tile_group_id for the background region 1710 is 255. Here, 255 represents a predetermined number, and the ID is not limited to 255. That is, when tile_group_id is 255, a tile set and a region constituting the tile set do not need to be separately indicated because the region is the background region.

Table 19 below shows a tile header for some tiles of FIG. 17 according to the first embodiment in a different way.

TABLE 19

| tile_id | 0 | 1 | 2 | 3 | 31 | 33 | 39 | 45 |
|---|---|---|---|---|---|---|---|---|
| independent_tile_flag | 0 | 0 | 0 | 0 | 0 | 0 | 0 | 0 |
| tile_group_id | 0 | 0 | 255 | 255 | 0 | 1 | 0 | 255 |
| tile_set_id | 0 | 0 | — | — | 1 | 0 | 1 | — |

For example, in FIG. 17, a tile having tile_id set to 3 has a boundary marked with a dotted line and is thus dependent. Accordingly, independent_tile_flag, a flag indicating whether the tile is independent, indicates 0. In addition, since the tile belongs to the background region, tile_group_id may indicate 255 in the tile header.

In the following embodiments, descriptions of the same parts as those of the first embodiment are omitted.

Second Embodiment

In the second embodiment of the present disclosure, picture splitting information and information about the independence of tiles constituting the picture are stored in the PPS, and only tile ID information is stored in the tile header, as in the previous embodiment. In the second embodiment, a separate syntax indicating the background region is provided. That is, while the first embodiment employs a tile group ID or a tile set ID to indicate the background region, the second embodiment has a separate syntax indicating the background region. In the second embodiment, the PPS and the tile header may vary depending on whether the tile is included in the background region. In addition, the tile header may contain information about whether the tile is independent and information about a tile group and a tile set.

In the second embodiment, tiles having the same tile group id (tile_group_id) and tile_set_id (tile_set_id) are dependent on each other during inter-prediction and filtering. That is, during inter-prediction and filtering, reference/use is determined according to the ID of the tile group and the ID of the tile set. Optionally, during inter-prediction and filtering, only the ID of the tile group of the tile may be checked to determine reference/use.

Table 20 below shows the PPS according to the second embodiment.

TABLE 20

```
pic_parameter_set_rbsp( ) {
    ...
    multiple_tiles_in_pic_flag
    ...
    if( multiple_tiles_in_pic_flag ) {
        num_tile_columns_minus1
        num_tile_rows_minus1
        uniform_spacing_flag
        if( !uniform_spacing_flag ) {
            for( i = 0; i < num_tile_columns_minus1; i++ )
                column_width_minus1[ i ]
            for( i = 0; i < num_tile_rows_minus1; i++ )
                row_height_minus1[ i ]
        }
        all_independent_tile_flag
        if( !all_independent_tile_flag ) {
            bg_tile_set_enabled_flag
            num_tile_groups_minus1
            for( i = 0; i < num_tile_groups_minus1; i++ ) {
                tile_group_id[ i ]
                num_tile_sets_minus1
                for( j = 0; j < num_tile_sets_minus1; j++ ) {
                    tile_set_id[ i ][ j ]
                    if( bg_tile_set_enabled_flag )
                        bg_tile_set_flag[ i ][ j ] (default: off)
                    if( !bg_tile_set_flag ) {
                        topleft_tile_id[ i ][ j ]
                        bottomright_tile_id[ i ][ j ]
                    }
                }
            }
        }
    }
}
```

The PPS according to the second embodiment includes a flag (bg_tile_set_enabled_flag) explicitly indicating that there is a background region, and a flag (bg_tile_set_flag) indicating whether the corresponding tile set is a background region. When the flag (bg_tile_set_flag) indicating whether the corresponding tile set is a background region is "on," the tile set is recognized as a tile set constituting the background region, and a region constituting the tile set is not separately indicated.

The picture of FIG. 16 may be represented with the PPS according to the second embodiment as follows:

```
all_independent_tile_flag = off;
bg_tile_set_enabled_flag = off;
num_tile_groups_minus1 = 1;
{tile_group_id = 0;
    num_tile_sets_minus1 = 1,
    tile_set_id = 0, topleft_tile_id = 0, bottomright_tile_id = 9,
    tile_set_id = 1, topleft_tile_id = 29, bottomright_tile_id = 39};
{tile_group_id = 1;
    num_tile_sets_minus1 = 0,
    tile_set_id = 0, topleft_tile_id = 33, bottomright_tile_id = 43};
```

That is, when the tiles constituting the background region have independence, all details are the same as those in the first embodiment except that bg_tile_set_enabled_flag is set to "off."

On the other hand, the picture of FIG. 17 in which the tiles constituting the background region have dependency on each other may be represented with a PPS according to the second embodiment as follows:

```
all_independent_tile_flag = off;
bg_tile_set_enabled_flag = on;
num_tile_groups_minus1 = 2;
{tile_group_id = 0;
    num_tile_sets_minus1 = 1,
    tile_set_id = 0, bg_tile_set_flag = off, topleft_tile_id = 0,
bottomright_tile_id = 9,
    tile_set_id = 1, bg_tile_set_flag = off, topleft_tile_id = 29,
bottomright_tile_id = 39};
{tile_group_id = 1;
    num_tile_sets_minus1 = 0,
    tile_set_id = 0, bg_tile_set_flag = off, topleft_tile_id = 33,
bottomright_tile_id = 43};
{tile_group_id = 2;
    num_tile_sets_minus1 = 0,
    tile_set_id = 0, bg_tile_set_flag = on};
```

When the tiles constituting the background region are dependent, bg_tile_set_enabled_flag is set to "on," and a flag (bg_tile_set_flag) indicating whether each tile set is a background region is included.

Table 21 below shows a tile header for some tiles of FIG. 17 according to the second embodiment.

TABLE 21

| tile_id | 0 | 1 | 2 | 3 | 31 | 33 | 39 | 45 |
| --- | --- | --- | --- | --- | --- | --- | --- | --- |
| independent_tile_flag | 0 | 0 | 0 | 0 | 0 | 0 | 0 | 0 |
| tile_group_id | 0 | 0 | 2 | 2 | 0 | 1 | 0 | 2 |
| tile_set_id | 0 | 0 | 0 | 0 | 1 | 0 | 1 | 0 |

For example, in FIG. 17, a tile having tile_id set to 3 belongs to tile group 2 among three tile groups 0, 1, and 2, and tile_set_id may indicate 0 in the tile header.

Table 22 below shows another PPS according to the second embodiment.

TABLE 22

```
pic_parameter_set_rbsp( ) {
    ...
    multiple_tiles_in_pic_flag
    ...
    if( multiple_tiles_in_pic_flag ) {
        num_tile_columns_minus1
        num_tile_rows_minus1
        uniform_spacing_flag
        if( !uniform_spacing_flag ) {
            for( i = 0; i < num_tile_columns_minus1; i++ )
                column_width_minus1[ i ]
            for( i = 0; i < num_tile_rows_minus1; i++ )
                row_height_minus1[ i ]
        }
        all_independent_tile_flag
        if( !all_independent_tile_flag ) {
            bg_tile_group_enabled_flag
            num_tile_groups_minus1
            for( i = 0; i < num_tile_groups_minus1; i++ ) {
                tile_group_id[ i ]
                if( bg_tile_group_enabled_flag )
                    bg_tile_group_flag[ i ] (default: off)
                if( !bg_tile_group_flag ) {
                    num_tile_sets_minus1
                    for( j = 0; j < num_tile_sets_minus1; j++ ) {
```

TABLE 22-continued

```
            tile_set_id[ i ][ j ]
            topleft_tile_id[ i ][ j ]
          bottomright_tile_id[ i ][ j ]
          }
        }
      }
    }
  }
}
```

The other PPS according to the second embodiment includes a flag (bg_tile_set_enabled_flag) explicitly indicating that there is a background region, and a flag (bg_tile_group_flag) indicating whether the corresponding tile group is a background region. When the flag (bg_tile_group_flag) indicating whether the corresponding tile group is a background region is "on," the tile group is recognized as a tile group constituting the background region, and a region constituting the tile group is not separately indicated.

The picture of FIG. 16 may be represented with the other PPS according to the second embodiment as follows:

```
all_independent_tile_flag = off;
bg_tile_group_enabled_flag = off;
num_tile_groups_minus1 = 1;
{tile_group_id = 0;
  num_tile_sets_minus1 = 1,
  tile_set_id = 0, topleft_tile_id = 0, bottomright_tile_id = 9,
  tile_set_id = 1, topleft_tile_id = 29, bottomright_tile_id = 39};
{tile_group_id = 1;
  num_tile_sets_minus1 = 0,
  tile_set_id = 0, topleft_tile_id = 33, bottomright_tile_id = 43};
```

That is, when the tiles constituting the background region have independence, all details are the same as those in the first embodiment except that the flag (bg_tile_set_enabled_flag) explicitly indicating there is a background region is set to "off."

The picture of FIG. 17 in which the tiles constituting the background region have dependency on each other may be represented with the other PPS according to the second embodiment as follows:

```
all_independent_tile_flag = off;
bg_tile_group_enabled_flag = on;
num_tile_groups_minus1 = 2;
{tile_group_id = 0, bg_tile_group_flag = off;
  num_tile_sets_minus1 = 1,
  tile_set_id = 0, topleft_tile_id = 0, bottomright_tile_id = 9,
  tile_set_id = 1, topleft_tile_id = 29, bottomright_tile_id = 39};
{tile_group_id = 1, bg_tile_group_flag = off;
  num_tile_sets_minus1 = 0,
  tile_set_id = 0, topleft_tile_id = 33, bottomright_tile_id = 43};
{tile_group_id = 2, bg_tile_group_flag = on};
```

When the tiles constituting the background region are dependent, the flag (bg_tile_set_enabled_flag) explicitly indicating that there is a background region is set to "on," and a flag (bg_tile_group_flag) indicating whether each tile group is included in the background region is included.

Table 23 below shows another tile header for some tiles of FIG. 17 according to the second embodiment.

TABLE 23

| tile_id | 0 | 1 | 2 | 3 | 31 | 33 | 39 | 45 |
|---|---|---|---|---|---|---|---|---|
| independent_tile_flag | 0 | 0 | 0 | 0 | 0 | 0 | 0 | 0 |

TABLE 23-continued

| tile_group_id | 0 | 0 | 2 | 2 | 0 | 1 | 0 | 2 |
|---|---|---|---|---|---|---|---|---|
| tile_set_id | 0 | 0 | — | — | 1 | 0 | 1 | — |

For example, in FIG. 17, for a tile having tile_id set to 3, tile_group_id may indicate 2 in the tile header.

Third Embodiment

In the third embodiment of the present disclosure, both picture splitting information and information about the independence of tiles constituting the picture are stored in the tile header. According to the third embodiment, the position, size, and dependency of a tile may be determined based on the tile header alone without using a PPS.

Table 24 below shows a tile header according to the third embodiment.

TABLE 24

```
tile_header( ) {
  tile_position
  tile_width
  independent_tile_flag
  if( !independent_tile_flag )
    tile_layout_type
  ...
}
```

The tile header according to the third embodiment includes a syntax (tile_position) indicating the CTU id of the tile start point (i.e., the top left corner), a syntax (tile_width) indicating the difference between the CTU id of the tile row end point (i.e., the top right corner) and the CTU id of the tile start point, a flag (independent_tile_flag) indicating whether a corresponding tile is dependent, and a syntax (tile_layout_type) indicating a relationship between the tile and neighboring tiles. Here, the tile start point represents the first CTU in the tile, and the tile row end point represents the top right CTU in the tile. The syntax indicating the relationship between the tile and the neighboring tiles indicates the type of the layout of the tile, and will be described in detail below.

Table 25 below shows another tile header according to the third embodiment.

TABLE 25

```
tile_header( ) {
  tile_position
  tile_width
  if ( !all_independent_tile_flag )
    independent_tile_flag (default: on)
  if( !independent_tile_flag )
    tile_layout_type
  ...
}
```

The other tile header according to the third embodiment may include a flag (all_independent_tile_flag) recorded in an upper header such as SPS or PPS.

FIG. 18 is a diagram illustrating an example of a picture according to a third embodiment of the present disclosure.

FIG. 18 shows CTU id rather than tile id for the picture of FIG. 16.

Table 26 below shows a tile header for some tiles of FIG. 18 according to the third embodiment.

TABLE 26

| tile_position | 0 | 2 | 4 | 6 | 110 | 130 | 142 | 166 |
|---|---|---|---|---|---|---|---|---|
| tile_width | 1 | 1 | 1 | 1 | 1 | 1 | 1 | 1 |
| independent_tile_flag | 0 | 0 | 1 | 1 | 0 | 0 | 0 | 0 |
| tile_layout_type | * | * | — | — | * | * | * | * |

For example, in FIG. 18, for a tile in which the CTU id starts from 4, the CTU id of the row end point of the tile is 5, the difference (tile_width) between the CTU id of the tile end point and the CTU id of the tile start point is 1, and thus the tile has independence. Accordingly, the syntax indicating the relationship with the neighboring tiles is meaningless. As another example, in FIG. 18, for a tile in which the CTU id starts from 0, the CTU id of the row end point of the tile is 1, the difference (tile_width) between the CTU id of the tile end point and the CTU id of the tile start point is 1, and thus the tile has dependency. Accordingly, the relationship with the neighboring tiles is indicated by the syntax (tile_layout_type) indicating the relationship between the tile and the neighboring tiles.

The relationship between the tile and neighboring tiles may be indicated in various ways.

As an example, whether there is a dependency on eight tiles neighboring one tile may be indicated with a maximum of 8 bits. However, when the tile is located at the boundary of the picture, that is, the tile has no neighboring tile, the dependency may not be indicated with bits. For example, in FIG. 18, for a tile in which the CTU id starts from 130, the syntax (tile_layout_type) indicating the relationship between the tile and neighboring tiles may be represented as "00001011" based on the top left tile. The first bit of "00001011," which is 0, indicates that the relationship with a tile in which the CTU id starts from 96 is independent, and the second bit of "00001011," which is 0, indicates that the relationship with a tile in which the CTU id starts from 98 is independent. The fifth bit of "00001011," which is 1, indicates that the relationship with a tile in which the CTU id starts from 132 is dependent. That is, a tile in which the CTU id starts from 130 has a dependency with tiles in which the CTU id starts from 132, 162, and 164. As another example, in FIG. 18, for a tile in which the CTU id starts from 166, the syntax (tile_layout_type) indicating the relationship between the tile and neighboring tiles may be represented as "11010". A tile in which the CTU id starts from 166 is located at the boundary of the picture and the syntax thereof may be indicated with 5 bits. The first bit of "11010," which is 1, indicates that the relationship with a tile in which the CTU id starts from 132 is dependent, and the third bit of "11010," which is 0, indicates that the relationship with a tile in which the CTU id starts from 136 is independent. That is, a tile in which the CTU id starts from 166 has a dependency with tiles in which the CTU id starts from 132, 134, and 164. Here, dependency is may be represented by 1, and independence may be represented by 0. In addition, the syntax may be expressed based on a tile at a location other than the top left tile.

As another example, the total number of bits of the syntax (tile_layout_type) indicating the relationship between the tile and neighboring tiles may be determined, and the meaning of each bit may be defined. For example, the first bit may indicate whether the tile is located inside the tile set or at the boundary (e.g., 0: inside, 1: boundary), and the second bit may indicate whether the tile located at the boundary is at a corner (e.g., 0: no corner, 1: corner). In addition, the third bit and the fourth bit may indicate a specific position of the tile located at the boundary, i.e., the top, bottom, left, or right boundary (e.g., when the tile is not located at a corner, 00: left boundary, 01: top boundary, 10: right boundary, 11: bottom boundary; when the tile is located at a corner, 00: top left corner, 01: top right corner, 10: bottom right corner, 11: bottom left corner). For example, in FIG. 18, for a tile in which the CTU id starts from 130, the syntax (tile_layout_type) indicating the relationship between the tile and neighboring tiles may be represented as "1100." The first bit of "1100," which is 1, indicates that the tile in which the CTU id starts from 130 is located at a tile set boundary, and the second bit of "1100," which is 1, indicates that the tile is located at the corner of the tile set. Further, the third bit and the fourth bit of "1100", which are 00, indicate that the tile is located at the top left corner. As another example, in FIG. 18, for a tile in which the CTU id starts from 132, the syntax (tile_layout_type) indicating the relationship between the tile and neighboring tiles may be represented as "1001". The first bit of "1001", which is 1, may indicate that the tile in which the CTU id starts from 132 is located at a tile set boundary, and the second bit of "1001", which is 0, indicates that the tile is not located at a position other than the corner of the tile set. In addition, the third bit and the fourth bit of "1001", which are 01, indicates that the tile is located at the top boundary.

The relationship between the tile and neighboring tiles may be expressed in various other ways.

Fourth Embodiment

In the fourth embodiment of the present disclosure, picture splitting information is stored in a tile header, and each tile is always independent. Alternatively, the picture splitting information is stored in the PPS, the tile id is stored in the tile header, and each tile is always independent. That is, all tiles are independent during intra-prediction, inter-prediction, entropy coding, and filtering. Therefore, only location information is included in the tile header. According to the fourth embodiment, there is no dependency between the tiles, and accordingly not only parallel processing but also distributed processing is possible. This may mean that N tiles can be independently encoded and decoded with N encoding apparatuses in an environment such as cloud computing. However, when multiple tiles are merged during playback, deterioration may occur at the tile boundary.

Table 27 below shows a tile header according to the fourth embodiment.

TABLE 27

```
tile_header( ) {
  tile_position
  tile_width
  ...
}
```

The tile header according to the fourth embodiment includes a syntax (tile_position) indicating a CTU id of a tile start point, and a syntax (tile_width) indicating the difference between the CTU id of a tile row end point and the CTU id of the tile start point.

Fifth Embodiment

In the fifth embodiment of the present disclosure, in order to address the deterioration occurring at the boundary of the tile when the fourth embodiment is implemented, a padding region or guard band is added to the boundary of each tile. Information about the added padding region is included in the tile header.

Table 28 below shows the tile header according to the fifth embodiment.

TABLE 28

```
tile_header( ) {
    tile_position
    tile_width
    for( i = 0; i < 4; i++ ) {
        band_width[ i ]
        band_type[ i ]
    }
}
```

The tile header according to the fifth embodiment includes a syntax (tile_position) indicating the CTU id of a tile start point, and a syntax (tile_width) indicating the difference between the CTU id of a tile row end point and the CTU id of the tile start point. In addition, the tile header includes a syntax (band_width) indicating luma pixel values of the left, top, right, and bottom padding regions of the tile and a syntax (band_type) indicating the type of a value to fill the padding region. The types of values to fill the padding region include a pixel value positioned at a boundary within the tile, an actual pixel value of a neighboring tile, and an average considering the distance between the pixel value positioned at the boundary within the tile and the actual pixel value of the neighboring tile.

Figure 19:
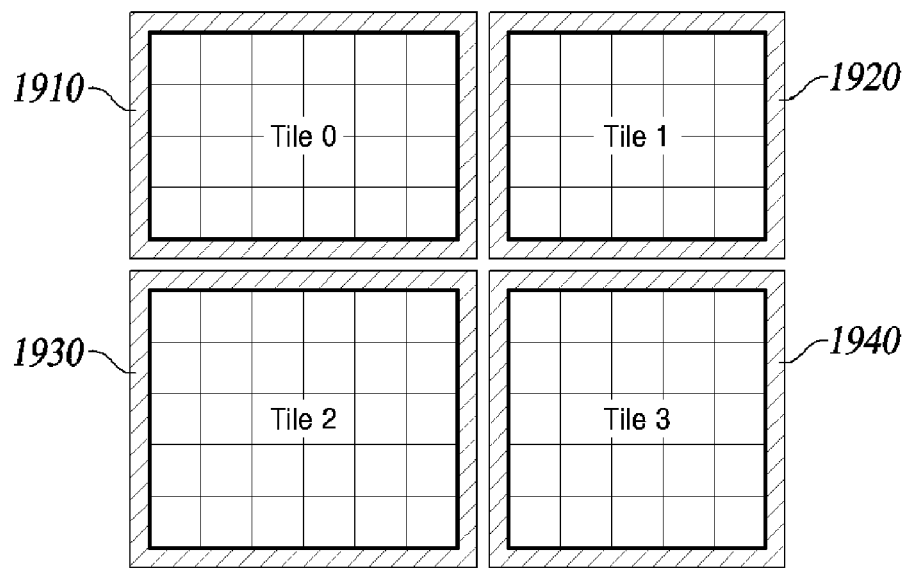
FIG. 19 is a diagram illustrating an example of a picture according to a fifth embodiment of the present disclosure.

FIG. 19 is a diagram illustrating an example of a picture according to a fifth embodiment of the present disclosure.

In FIG. 19, a picture is composed of four tiles. Padding regions 1910, 1920, 1930, and 1940 are set on the left, top, right, and bottom sides of the four tiles, and values are put in the padding regions. Thereafter, in encoding/decoding, distributed processing is performed on the respective tiles. After decoding, the padding regions 1910, 1920, 1930, and 1940 are removed and the tiles are merged. Thereby, the deterioration occurring at the boundary of the tiles may be addressed.

Additionally, type information about a tile may be included in the tile headers according to the third to fifth embodiments of the present disclosure. The type information about the tile may include information about whether the tile belongs to a tile set and/or is included in the background region.

Also, in the present disclosure, id may be replaced with an index of an array.

Figure 20:
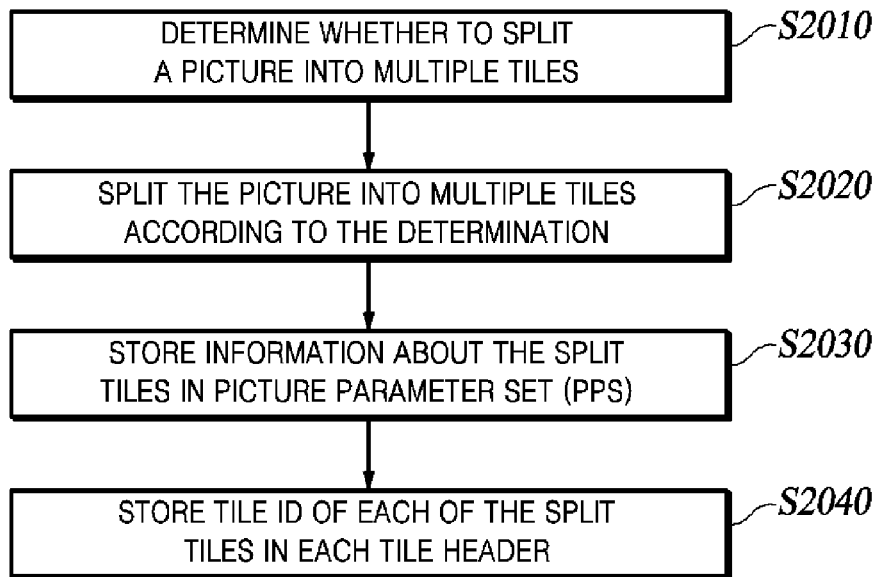
FIG. 20 is a flowchart illustrating a method of configuring, by a video encoding apparatus, one picture according to the present disclosure.

FIG. 20 is a flowchart illustrating a method of configuring, by a video encoding apparatus, one picture according to the present disclosure.

The apparatus, specifically, the block splitter of the apparatus determines whether to split a picture into multiple tiles (S2010).

The apparatus splits the picture into multiple tiles according to the determination (S2020). Whether the picture is split into multiple tiles may be stored in a flag (e.g., multiple_tiles_in_pic_flag).

The apparatus, specifically, the encoder of the apparatus generates a PPS containing information about the split tiles (S2030). The information about the split tiles may include information about whether the picture is split into multiple tiles, and whether all the split tiles are independent from each other. Whether all the split tiles are independent from each other may be stored in a flag (e.g., all_independent_tile_flag) and included in the PPS.

The apparatus generates each tile header including a tile ID of each of the split tiles (S2040).

While it is specifically mentioned in the present disclosure that the block splitter and the encoder of the apparatus perform the above-described procedure, one component may perform all the above procedure or multiple components may perform the above procedure in a distributed manner.

Figure 21:
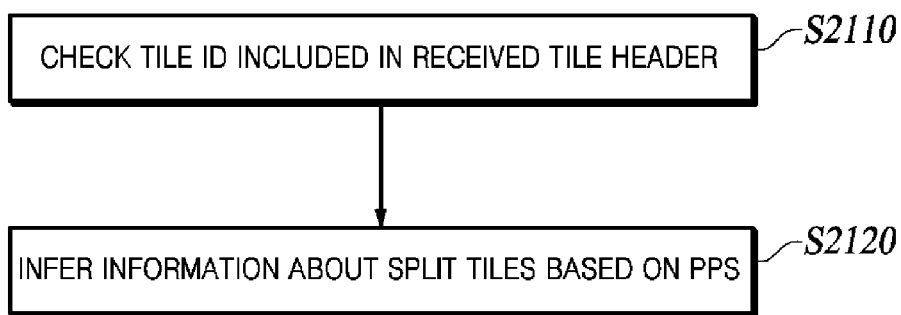
FIG. 21 is a flowchart illustrating determining, by a video decoding apparatus, a single picture according to the present disclosure.

FIG. 21 is a flowchart illustrating determining, by a video decoding apparatus, a single picture according to the present disclosure.

The apparatus, specifically, the decoder of the apparatus receives a bitstream, decodes the received bitstream, and checks the tile id included in the tile header (S2110). The apparatus may determine whether a picture is split into multiple tiles based on the tile id.

The apparatus infers information about the split tiles based on the PPS included in the received bitstream (S2120). In addition, the apparatus may determine whether the picture is split into multiple tiles based on the information about the split tiles. The information about the split tiles may include information about whether the picture is split into multiple tiles, and whether all the split tiles are independent from each other. Whether all the split tiles are independent from each other may also be included in the PPS as a flag (e.g., all_independent_tile_flag) and received.

Figure 22:
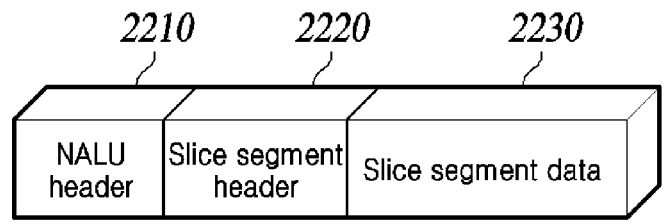
FIG. 22 is a diagram illustrating a NAL unit of a slice segment as an example.

FIG. 22 is a diagram illustrating a NAL unit of a slice segment as an example.

Specifically, the NAL unit includes a NALU header 2210, a slice segment header 2220, and a slice segment data 2230 in this order. Each slice segment is composed of a NAL unit, and the NAL unit is transmitted in the form of a bitstream.

On the other hand, in the case of a tile, there is no separate header, and part of the tile-related information is carried in a supplement enhancement information (SEI) message.

In the following, a picture is split into tiles to process the picture in parallel. In the present disclosure, a method of defining tiles having similar characteristics or any tiles as a tile group, and transmitting information about the tile group is proposed.

Specifically, tiles belonging to a tile group may refer to a reference picture during inter-prediction and may share arbitrary moving vector (MV) information. Alternatively, whether to refer to/share related information may be signaled through a syntax. In addition, for the tiles belonging to the tile group, whether to filter pixel values located at a tile boundary during in-loop filtering may be controlled through a syntax. However, during intra-prediction and/or entropy coding, tiles are not referenced because there is no correlation therebetween. The correlation between the tiles belonging to the tile group may be defined as a syntax in the tile group header.

Figure 23:
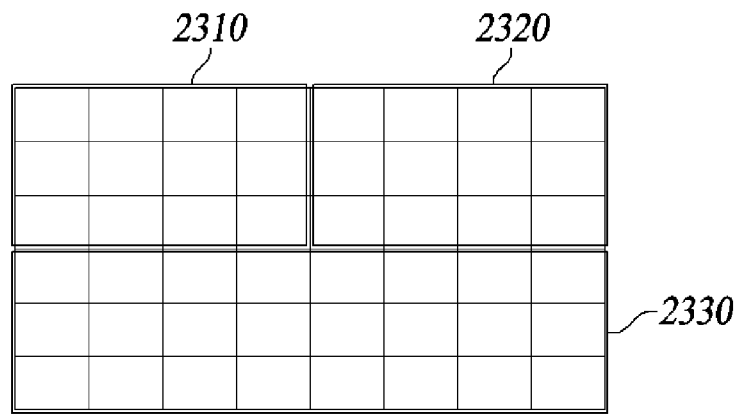
FIG. 23 is a diagram illustrating an example of a tile group according to the present disclosure.

FIG. 23 is a diagram illustrating an example of a tile group according to the present disclosure.

FIG. 23 shows that one picture is split into 48 (=8×6) tiles. The 48 tiles may be split into three groups 2310, 2320, and 2330. Each split tile group may be configured as an independent NAL unit.

Figure 24:
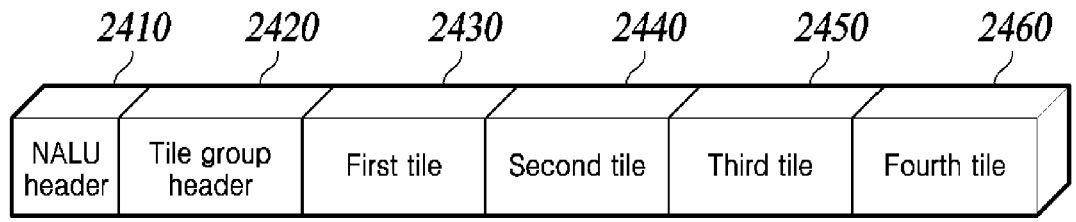
FIG. 24 is a diagram illustrating a NAL unit of a tile group according to the present disclosure as an example.

FIG. 24 is a diagram illustrating a NAL unit of a tile group according to the present disclosure as an example.

Like the NAL unit of the slice segment, the NAL unit of the tile group also includes a NALU header 2410, a tile group header 2420, and tiles constituting a tile group, that is, a first tile 2430 and a second tile 2440, a third tile 2450, and a fourth tile 2460 in this order. A NAL unit may be composed of one tile group. The tile group header 2420 includes common information about the tiles 2430, 2440, 2450, and 2460 included in the tile group. A tile may consist of a tile header and tile data. Alternatively, a tile may consist of only tile data. Finally, the NAL unit is generated and transmitted as a bitstream.

When the NAL unit is composed of a tile group, information about the tile group may be predefined as a NAL type. Table 29 below shows an example of the NAL types. Here, an intra picture represents an intra random access point (IRAP) picture, and an inter picture represents a non-IRAP picture. The values of NAL type index in Table 29 are an example, and the IRAP index and the non-IRAP index are interchangeable with each other. In addition, the IRAP picture and/or the non-IRAP picture may be further subdivided and defined as one or more NAL types. For example, a non-IRAP picture may be defined as a different NAL type depending on whether it is used as a reference picture.

TABLE 29

| NAL type index | Name for NAL type | NAL content | NAL type class |
|---|---|---|---|
| 0 | Intra | Coded TG of intra picture | VCL |
| 1 | Inter | Coded TG of inter picture | VCL |

Figure 25:
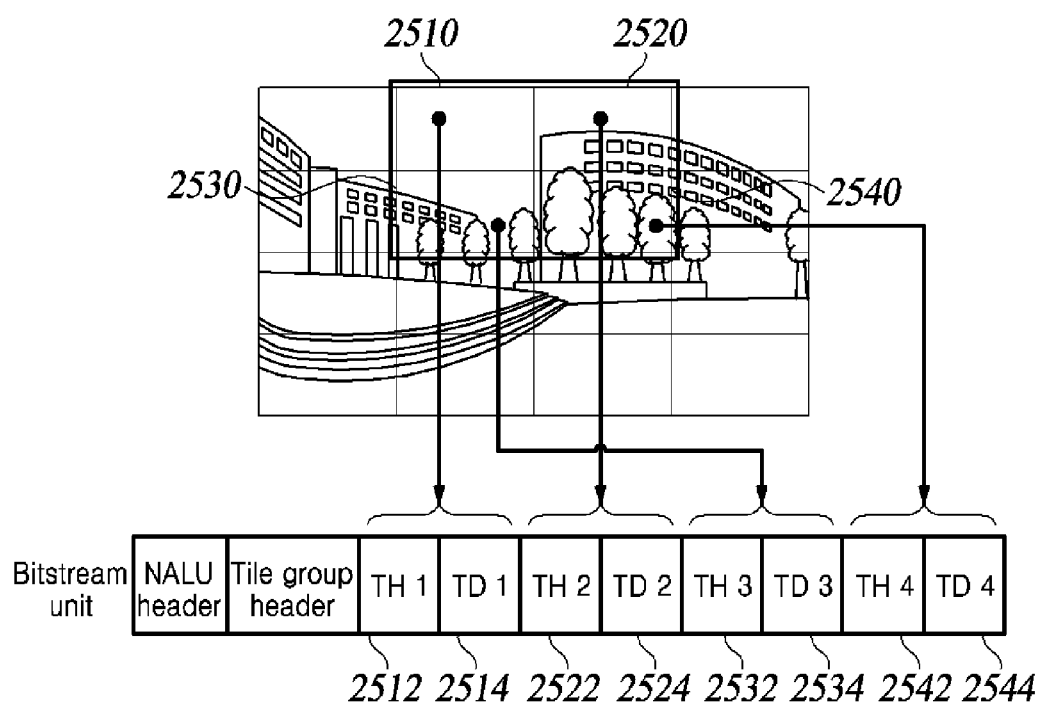
FIG. 25 is a diagram illustrating an example of a tile group in a picture and a NAL unit of the tile group according to the present disclosure.

FIG. 25 is a diagram illustrating an example of a tile group in a picture and a NAL unit of the tile group according to the present disclosure.

Referring to FIG. 25, one picture may be split into 16 (=4×4) tiles, of which 4 tiles 2510, 2520, 2530, and 2540 are included in one tile group. The tile group may consist of one NAL unit, and the NAL unit includes a NALU header, a tile group header, a tile header 2512 and tile data 2514 of the first tile 2510 belonging to the tile group, and a tile header 2522 and tile data 2524 of the second tile 2520, a tile header 2532 and tile data 2534 of the third tile 2530, and a tile header 2542 and tile data 2544 of the fourth tile 2540. Alternatively, the NAL unit may include only tile data without the tile headers for the four tiles. In this case, the four tiles 2510, 2520, 2530, and 2540 belonging to the tile group may be included in the NAL unit in order of raster scans within a corresponding picture.

Hereinafter, a picture level header indicating information about one picture, a tile group header indicating information common to the tiles belonging to one tile group, and a tile header indicating information about each tile will be described in detail. Here, the picture level header may be composed of one NAL unit separately from the tile group NAL unit. For example, the NAL unit for the picture level header may be defined as a non-VCL NAL type having a NAL type index set to "17."

First, the picture level header indicating information about one picture will be described. Table 30 below shows the syntax of the picture level header.

TABLE 30

```
picture_header_rbsp( ) {
    picture_header_id
    ...
    multiple_tiles_in_pic_flag
    if( multiple_tiles_in_pic_flag ) {
        num_tile_columns_minus1
        num_tile_rows_minus1
        uniform_spacing_flag
        if( !uniform_spacing_flag ) {
            for( i = 0; i < num_tile_columns_minus1; i++ )
                column_width_minus1[ i ]
```

TABLE 30-continued

```
            for( i = 0; i < num_tile_rows_minus1; i++ )
                row_height_minus1[ i ]
        }
    }
    ...
```

The picture level header includes tile layout information about tiles for one picture in addition to the id (picture_header_id) of the picture header. That is, the picture level header includes a syntax (multiple_tiles_in_pic_flag) indicating whether one picture has one tile or multiple tiles, and detailed information about the layout of the tiles when multiple tiles are in the picture. Here, the flag (multiple_tiles_in_pic_flag) indicating whether the picture is split into multiple tiles may be replaced with a flag (single_tile_in_pic_flag) indicating whether the picture is composed of one tile. For example, when there are multiple tiles in the picture, the picture level header includes a syntax (num_tile_columns_minus1) for the number of tiles split based on the row of the picture, a syntax (num_tile_rows_minus1) for the number of tiles split based on the column of the picture, and a syntax (uniform_spacing_flag) indicating whether the picture is split uniformly based on the row and column. When the picture is split uniformly based on the row and column, the picture is split uniformly by the number of split tiles, and the basic unit of splitting may be a multiple of m. Here, m may represent a basic unit for storing a moving vector (MV) in a memory. Alternatively, m may be an integer determined by the encoder. In this case, the encoder should transmit the value of m to the decoder over a bitstream. Alternatively, m may be a constant identically designated by the encoder and the decoder. In general, in storing MVs, the MVs of both tiles located at the tile boundary may or may not be set to one MV. In the present disclosure, for simplicity, m is assumed to be 8.

For example, when the resolution of a picture is 3840× 2160, the value of m is 8, and the picture is split uniformly such that the number of row tiles is 5 and the number of column tiles is 3, one tile has a resolution of is 768×720, and the picture is composed of 15 (=5×3) tiles. In addition, all the 15 tiles have the same size. Here, 768 and 720 are multiples of 8.

As in the standard HEVC, when m is 64, which is the CTU size, on the same condition, tiles located in the upper two rows have a resolution of 768×704, and tiles located in the last row have a resolution of 768×752. This is because the CTU size is the reference for splitting, and thus tiles located in the upper two rows are split by a multiple of 64, and tiles located in the last row include the remaining region other than the tiles located in the upper two rows.

When the tiles are not uniformly split into the rows and columns, the picture level header further includes a syntax (column_width_minus1) indicating the width of each tile based on the row and a syntax (row_height_minus1) indicating the height of each tile based on the column Even in this case, the basic unit of splitting may be m.

Hereinafter, a tile group header representing information common to all tiles belonging to one tile group will be described.

First, one tile group may be configured in one square shape.

Table 31 below shows the syntax of the tile group header as an example.

TABLE 31

```
tile_group_header( ) {
tg_address
tg_picture_header_id
  tg_type
  ...
  if( multiple_tiles_in_pic_flag ) {
    multiple_tiles_in_tg_flag
    if( multiple_tiles_in_tg_flag ) {
      if ( tg_type != intra ) {
        tg_inter_prediction_across_tiles_enabled_flag
        tg_temporal_MV_across_tiles_enabled_flag
      }
        tg_loop_filter_across_tiles_enabled_flag
    }
  }
  ...
  guard_band_enabled_flag
  if( guard_band_enabled_flag ) {
    gb_padding_type
    gb_left_width
    gb_right_width
    gb_top_height
    gb_bottom_hiehgt
  }
  ...
  tg_level_idc
  tg_tier_flag
  ...
  init_qp_minus32
  total_tiles = 0
if( multiple_tiles_in_tg_flag ) {
    tg_num_tile_columns_minus1
    tg_num_tile_rows_minus1
    total_tiles = (tg_num_tile_columns_minus1 + 1) x (tg_num_tile_rows_minus1 + 1)
  }
  for( i = 0; i < total_tiles; i++ ) {
    tile_header( )
    tile_data( )
  }
  ...
}
```

The tile group header includes information about a tile group. For example, the tile group header includes a syntax (tg_address) indicating the position of the tile group in a picture, a syntax (tg_picture_header_id) indicating an ID of a picture header referred to by the tile group, and a syntax (tg_type) indicating the type of the tile group. The position of the tile group in the picture may be indicated based on the position of the top left pixel of the picture. Alternatively, the position of the tile group in the picture may be indicated for each row and column in the form of a multiple of a basic unit of picture splitting, or indicated by a single value which is a multiple of 8 in order of raster scan. Alternatively, the position of the tile group in the picture may be indicated by indexes of the row and column for the top left tile belonging to the tile group according to the tile layout, or indicated by one index (tile id) for the top left tile in raster scan order. The syntax (tg_picture_header_id) indicating the ID of the picture header referred to by the tile group represents an ID value defined in the picture header. The type of the tile group is one of tile group B, tile group P, and tile group I.

In addition, the tile group header may include a syntax (multiple_tiles_in_tg_flag) indicating whether there are multiple tiles in the tile group, a syntax (tg_inter_prediction_across_tiles_enabled_flag) indicating whether other neighboring tiles are referred to in inter-prediction across tiles in the tile group, a syntax (tg_temporal_MV_across_tiles_enabled_flag) indicating whether to derive and use a temporal MV in neighboring tiles in addition to the corresponding tile in the reference picture in the merge mode and the advanced motion vector prediction (AMVP) mode, and a syntax (tg_loop_filter_across_tiles_enabled_flag) indicating whether to use neighboring tile information in in-loop filtering. Here, for the syntax indicating whether to derive and use a temporal MV in neighboring tiles in addition to the corresponding tile in the reference picture in the merge mode and the AMVP mode, when the corresponding function is enabled in a higher level header (e.g., SPS) and then it is determined whether to use the function again at the level of the corresponding tile group, it may be determined whether to derive a temporal MV across tiles. For example, when sps_temporal_mv_enabled_flag is enabled and tg_temporal_mv_enabled_flag is enabled, a value of tg_loop_filter_across_tiles_enabled_flag may be defined. The syntax may be replaced with a syntax (tg_collocated_block_across_tiles_enabled_flag) indicating whether to refer to a neighboring tile in searching for a collocated block to take a temporal MV. In addition, the syntax indicating whether to refer to a neighboring tile in inter-prediction across tiles in the tile group and the syntax indicating whether to use neighboring tile information in loop filtering may be represented by one syntax. When the syntax does not allow a neighboring tile to be referred to, the reconstructed pixel value of the neighboring tile cannot be referred to in inter-prediction. Neither can the MV of the neighboring tile be referred to.

The tile group header may also include a syntax (guard_band_enabled_flag) indicating whether a certain portion of the boundary region of the tile group is padded, and a syntax (gb_padding_type) indicating the type of values to be put in the padding region (e.g., Boundary pixel value of the tile group: 0, Actual pixel value of a neighboring tile: 1, Average value considering the distance between the boundary pixel value in the tile and the actual pixel value of the neighboring tile: 2), and a syntax (gb_left_width/gb_right_width/gb_top_height/gb_bottom_height) indicating the left/right/top/bottom padding size of the tile group. The padding size of each side of the tile group may be indicated by a luma-based pixel value, or may be set in an array form. The syntax (gb_padding_type) indicating the type of values to be put in the padding region may be separately designated for each of the left/right/top/bottom padding regions of the tile group. For example, an actual pixel value (1) of an neighboring tile may be designated for the left and right padding regions of the tile group, and a copy value (0) of a boundary pixel value of the tile group may be designated for the top and bottom padding regions. In addition, the guard band information may define padding for an input picture (tile group) in encoding or may define padding for a reference picture (tile group) in decoding.

The tile group header may include a syntax (tg_level_idc) indicating a level value for the tile group, and a syntax (tg_tier_flag) indicating a tier value of the tile group. The syntaxes are provided to inform the decoder of the resolution value and memory for the tile group, which are information necessary for decoding of each tile group. The two syntaxes may be limited to be transmitted when a separate flag (adaptive_level_tier_enabled_flag) is enabled.

The tile group header may include a syntax (init_qp_minus32) indicating a value obtained by subtracting 32 from the value of an initial quantization parameter (QP) that is to be applied to the tile group.

The tile group header may further include a syntax (tg_num_tile_columns_minus1) indicating a value obtained by subtracting 1 from the number of tiles included in the tile group on the column basis, and a syntax (tg_num_tile_rows_minus1) indicating a value obtained by subtracting 1 from the number of tiles included in the tile group on the row basis. Using the two syntaxes, the total number of tiles (total_tiles) in the tile group may be calculated. Alternatively, the number of all tiles included in the tile group may be indicated by an id (tile id) of the bottom right tile belonging to the tile group. The number of tiles included in the tile group may be represented by one syntax (num_tiles_in_tg_minus1) by combining the syntaxes based on the row and the column. The syntax indicates a value obtained by subtracting 1 from the total number of tiles in the tile group.

This may be applied differently depending on the shape of the tile group. For example, when the tile group is rectangular, it may be represented as a value obtained by subtracting 1 from the number of tiles included based on the row and the column, or represented as an id (tile id) for the bottom right tile belonging to the tile group. On the other hand, when the tile group is defined in order of raster scan of tiles based on the tile layout in a picture regarding the shape of the tile group, the number of tiles included in the tile group may be specified as a value obtained by subtracting 1 from the total number of tiles in the tile group in order of raster scan.

The syntax indicating whether inter-prediction, temporal MV, and loop filtering are applied across tiles in a tile group may also be represented as in Table 32 below.

TABLE 32

```
tile_group_header( ) {
    ...
    if( multiple_tiles_in_pic_flag ) {
        multiple_tiles_in_tg_flag
        if( multiple_tiles_in_tg_flag ) {
            all_independent_tiles_flag
            if( !all_independent_tiles_flag ) {
                if ( tg_type != intra ) {
                    tg_inter_prediction_across_tiles_disabled_flag
                    tg_temporal_MV_across_tiles_disabled_flag
                }
                    tg_loop_filter_across_tiles_disabled_flag
            }
        }
    }
    ...
}
```

When multiple tiles are present in a tile group, a syntax (all_independent_tiles_flag) indicating that all tiles are independently encoded and decoded may be used. That is, the syntax indicates that encoding and decoding can be executed in inter-prediction and/or loop filtering without referring to the information about neighboring tiles. Specifically, when the value of the syntax is 0, neighboring tile information is used, and reference for each of the inter-prediction, temporal MV, and/or loop filter is separately designated.

Other syntaxes are the same as those described in Table 31, and thus description thereof is omitted.

Among the syntaxes included in the tile group header, syntaxes related to the guard band may be included in any one of the picture level header and supplemental enhancement information (SEI).

Secondly, multiple tiles rectangles, may be configured as one tile group. In this case, the syntax of the tile group header may be represented as shown in Table 33 below.

TABLE 33

```
tile_group_header( ) {
tg_picture_header_id
 tg_type
    ...
 if( multiple_tiles_in_pic_flag ) {
        multiple_tiles_in_tg_flag
        if( multiple_tiles_in_tg_flag ) {
        num_tile_rectangulars_in_tg_minus1
        for( i = 0; i < num_tile_rectangulars_in_tg_minus1; i++ ) {
           topleft_tile_id[ i ]
           bottomright_tile_id[ i ]
           hor_tiles = floor{(bottomright_tile_id[i] − topleft_tile_id[i]) /
(column_width_minus1 + 1)}
           ver_tiles = bottomright_tile_id[i] − {topleft_tile_id[i] + (column_width_minus1 +
1) x (hor_tiles − 1)} + 1
             num_tiles[ i ] = hor_tiles x ver_tiles
        }
```

TABLE 33-continued

```
    }
  }
  ...
  if(multiple_tiles_in_tg_flag) {
    for( i = 0; i < num_tile_rectangular_minus1; i++ ) {
      if ( tg_type != intra ) {
        tg_inter_prediction_across_tiles_enabled_flag[ i ]
        tg_temporal_MV_across_tiles_enabled_flag[ i ]
      }
      tg_loop_filter_across_tiles_enabled_flag[ i ]
      }
    }
    ...
    total_tiles = 0
if( tg_multiple_tiles_flag ) {
    for( i = 0; i < num_tile_rectangular_minus1; i++ )
      total_tiles += num_tiles[ i ]
  }
  for( i = 0; i < total_tiles; i++ ) {
    tile_header( )
    tile_data( )
  }
  ...
}
```

The tile group header includes information about multiple tile rectangles. For example, the tile group header may include a syntax (num_tile_rectangular_minus1) indicating the number of tile rectangles included in the tile group, and a syntax (topleft_tile_id/bottomright_tile_id) indicating the id values of the top left/bottom right tiles of a tile rectangle. The syntax (tg_inter_prediction_across_tiles_enabled_flag indicating whether to refer to neighboring tiles in inter-prediction across tiles in the tile group, the syntax (tg_temporal_MV_across_tiles_enabled_flag lip indicating whether to derive and use a temporal MV in neighboring tiles in addition to the corresponding tile in the merge mode and the AMVP mode, and the syntax (tg_loop_filter_across_tiles_enabled_flag[i]) indicating whether to use neighboring tile information in loop filtering described above may be set for each tile rectangle.

Figure 26:
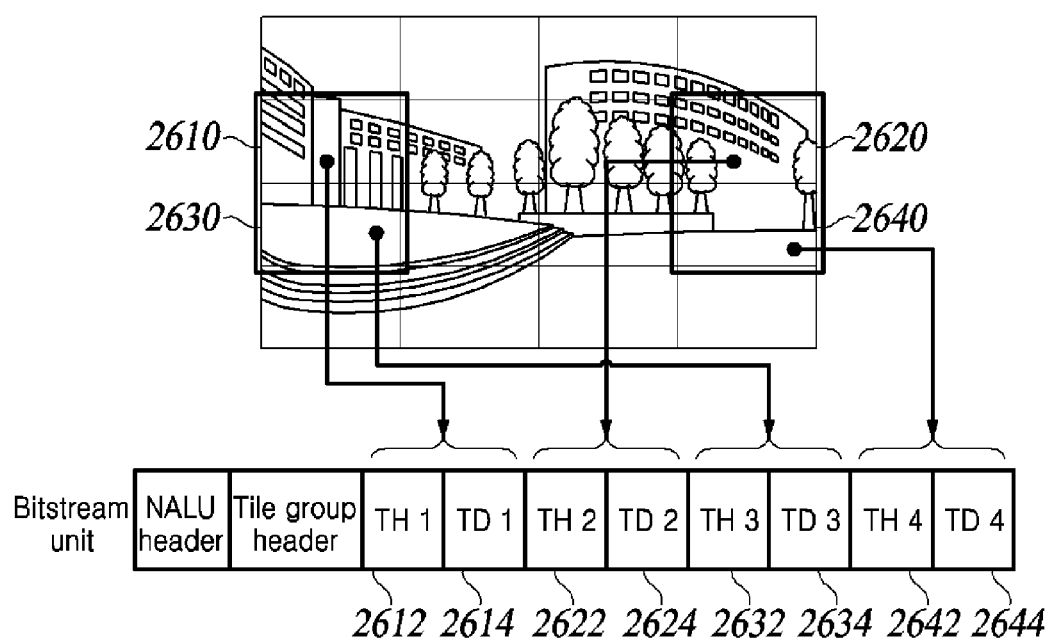
FIG. 26 is a diagram illustrating a tile group in a picture and a NAL unit of the tile group according to another embodiment of the present disclosure.

FIG. 26 is a diagram illustrating a tile group in a picture and a NAL unit of the tile group according to another embodiment of the present disclosure.

As in the example of FIG. 25, in FIG. 26, one picture is split into 16 (=4×4) tiles. However, in FIG. 26, one tile group includes two tiles rectangles, wherein a first tile rectangle is composed of two tiles 2610 and 2630, and a second tile rectangle is two tiles 2620 and 2640. In FIG. 26, the one tile group is composed of one NAL unit. The NAL unit may include a NALU header, a tile group header, tile headers 2612, 2622, 2632, 2642 of tiles belonging to the tile group, and tile data 2614, 2624, 2634, and 2644. Alternatively, the NAL unit may include only tile data without the tile headers for the four tiles. The tiles belonging to the tile group may be included in the NAL unit in raster scan order or may be included in the NAL unit in raster scan order for each tile rectangle. FIG. 26 shows that the tiles belonging to the tile group are included in the NAL unit in order of raster scan.

Lastly, the tile header and tile data will be described. The tile header contains information about one tile. Table 34 below shows the syntax of the tile header as an example.

TABLE 34

```
tile_header( ) {
  start_code_prefix
  tile_idx
```

TABLE 34-continued

```
  ...
  tile_qp_delta
  ...
}
```

For example, the tile header includes a syntax (start_code_prefix) indicating a start point functioning as an entry point to allow random access to one tile among multiple tiles in a bitstream corresponding to one tile group, a syntax (tile_idx) indicating the index of the tile based on the tile layout defined in a picture level header, and a syntax (tile_qp_delta) indicating the value of ΔQP for a QP value to be applied to the CTU and the CU included in the tile, based on the initial QP value suggested in the tile group to which the tile belongs. The index of the tile may be designated for each row and column, or may be designated as one index in order of raster scan.

The QP value to be applied to the tile may be calculated using Equation 1 below.

$$tile\_qp = init\_qp\_minus32 + 32 + tile\_qp\_delta \qquad \text{Equation 1}$$

Table 35 below shows the syntax of the tile data as an example.

TABLE 35

```
tile_data( ) {
  do {
    coding_tree_unit( )
  } while ( !end_of_tile )
}
```

Figure 27:
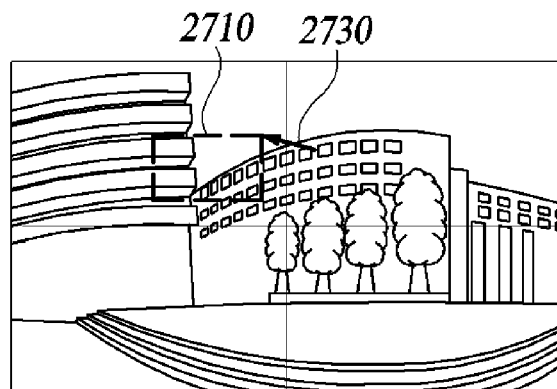
FIG. 27 is a diagram illustrating that some regions refer to other regions in a tile group during inter-prediction according to an embodiment of the present disclosure.
Figure 27:
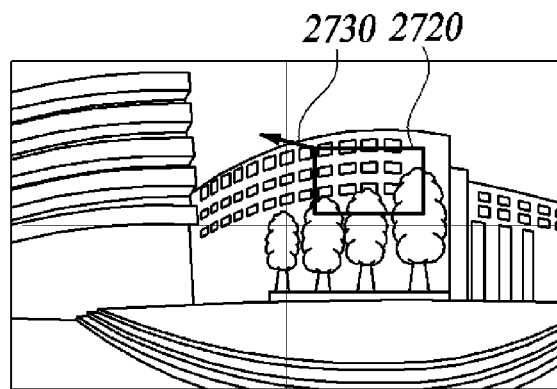

FIG. 27 is a diagram illustrating that some regions refer to other regions in a tile group during inter-prediction according to an embodiment of the present disclosure.

FIG. 27(b) shows a tile group in the current picture, and FIG. 27(a) shows the same tile group of the current picture in a reference picture. In FIG. 27(b), a rectangular region 2720 represents a block to be encoded, and an arrow 2730 indicates the motion of the rectangular region 2720. In other words, a rectangular region 2710 in FIG. 27(a) represents a reference block indicated by the MV of the block to be encoded.

For example, when the syntax (tg_inter_prediction_across_tiles_enabled_flag) indicating whether other tiles are referred to in inter-prediction across tiles in the tile group header is set to indicate referencing, the rectangular region 2710 in FIG. 27(*a*) may be used as a reference block. On the other hand, when the syntax is set to indicate no referencing, a reference block is generated with a pixel value in the top right tile of the rectangular region 2720 in FIG. 27(*b*) without referring to other tiles. In this case, a processing procedure for a case where the top right tile is regarded as one picture and referred to outside the picture boundary may be performed. That is, this means copying and padding a pixel value of the picture boundary, and a portion outside the boundary is filled with boundary pixels. Details will be described below with reference to FIG. 28.

Figure 28:
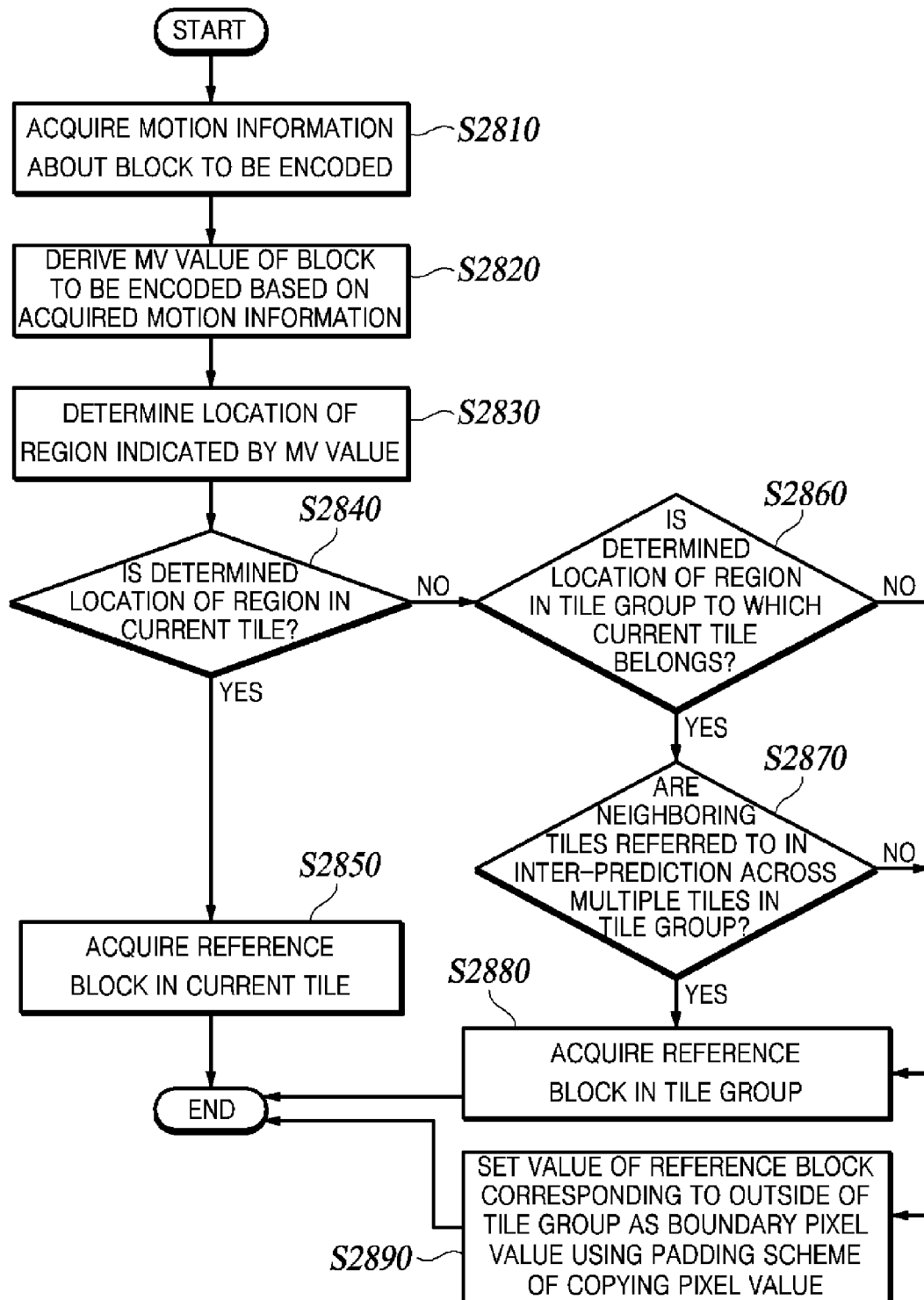
FIG. 28 is a flowchart illustrating inter-prediction according to an embodiment of the present disclosure.

FIG. 28 is a flowchart illustrating inter-prediction according to an embodiment of the present disclosure.

A reference picture, motion vector difference (mvd), and motion vector predictor (mvp), which are motion information about a block to be encoded, are acquired (S2810).

The my value of the block to be encoded is derived based on the acquired motion information (S2820).

The location of the region indicated by the my value is determined (S2830).

It is checked whether the determined location of the region is within the current tile (S2840).

When the determined location of the region is within the current tile, a reference block is acquired within the current tile (S2850).

When the determined location of the region is not within the current tile, it is checked whether the determined location of the region is within a tile group to which the current tile belongs (S2860).

When the determined location of the region is within the tile group to which the current tile belongs, it is checked whether other tiles are referred to in inter-prediction across multiple tiles in the tile group (S2870).

When it is determined that other tiles are referred to in the inter-prediction across multiple tiles in the tile group, a reference block is acquired in the tile group (S2880).

However, when the determined location of the region is not within the tile group to which the current tile belongs, or it is determined that the determined location of the region is within the tile group to which the current tile belongs, but other neighboring tiles are not referred to in inter-prediction across multiple tiles in the tile group, the reference block corresponding to the outside of the tile group is filled with boundary pixel values using the padding scheme of copying pixel values (S2890). Here, one tile group is regarded as a separate picture, and padding of boundary pixel values is performed on the boundary of the tile group as in picture boundary processing. Alternatively, the my value is clipping to the nearest boundary value in the current tile.

Figure 29:
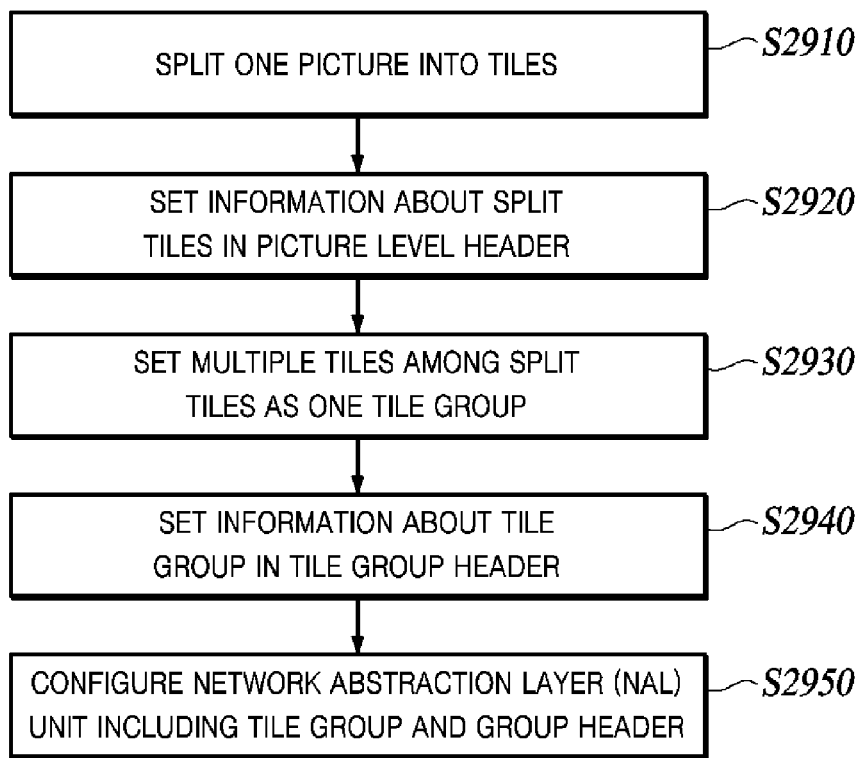
FIG. 29 is a flowchart illustrating a method of configuring, by a video encoding apparatus, one picture according to the present disclosure.

FIG. 29 is a flowchart illustrating a method of configuring, by a video encoding apparatus, one picture according to the present disclosure.

The apparatus, specifically, the block splitter of the apparatus splits the one picture into tiles (S2910).

The encoder of the apparatus sets information about the split tiles in a picture level header (S2920). The information about the split tiles may be layout information about the split tiles. Specifically, the information may include information about whether the picture is uniformly split into rows and columns, the number of tiles split by the row, and the number of tiles split by the column.

The encoder sets multiple tiles among the split tiles as one tile group (S2930). In detail, tiles of similar characteristics among the split tiles may be set as the one tile group. In addition, the multiple tiles may be configured as multiple tile rectangles, and the multiple tile rectangles may be set as the one tile group.

The encoder sets information about the tile group in the tile group header (S2940). The tile group header may include information indicating the location of the tile group, whether to refer to other neighboring tiles in inter-prediction across tiles in the tile group, and whether to use neighboring tile information in loop filtering. The tile group header may further include information about whether a certain portion of the boundary region of the tile group is padded, information about values put in the padding region when padding is performed.

The encoder is configured in a network abstraction layer (NAL) unit including the tile group and the tile group header (S2950). The NAL unit may further include tile headers and tile data of the tiles included in the tile group.

While it is specifically mentioned in the present disclosure that the block splitter and the encoder of the apparatus perform the above procedure, one component may perform all the above procedure or multiple components may perform the above procedure in a distributed manner.

Figure 30:
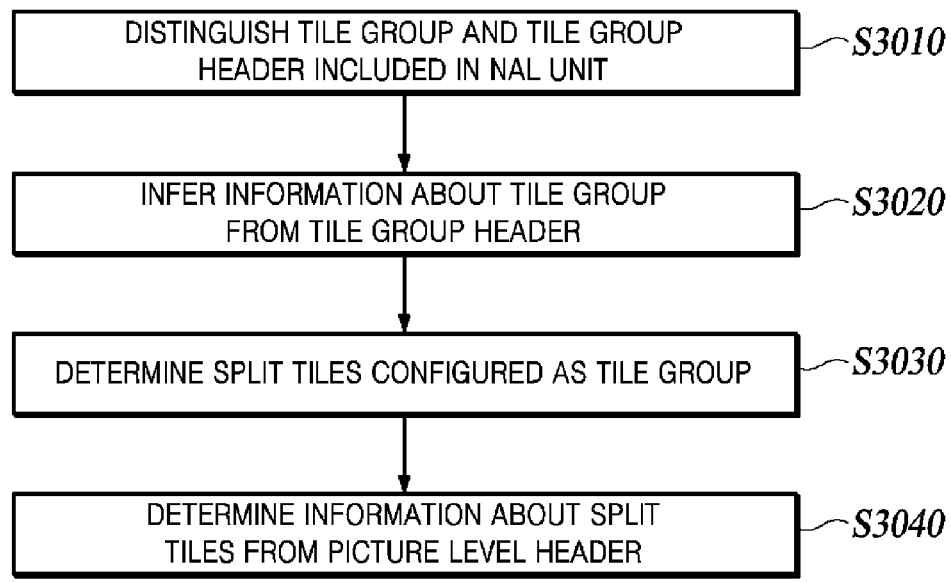
FIG. 30 is a flowchart illustrating a method of determining, by a video decoding apparatus, a single picture according to the present disclosure.

FIG. 30 is a flowchart illustrating a method of determining, by a video decoding apparatus, a single picture according to the present disclosure.

The apparatus, specifically, the decoder of the apparatus receives a bitstream, decodes the received bitstream, and distinguishes a tile group and a tile group header included in the NAL unit (S3010).

The apparatus infers information about the tile group from the tile group header (S3020).

The apparatus determines split tiles configured as a tile group (S3030).

The apparatus determines information about the split tiles from the picture level header (S3040).

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A method for decoding, from an SEI (supplemental enhancement information) message of a bitstream, level information for each of a plurality of regions partitioned from each of pictures included in a video sequence, the level information being information for defining a level of decoding capability of a video decoding apparatus including maximum resolution up to which the video decoding apparatus is processible, the method comprising:
    decoding a first flag indicating whether extra information is defined, and default level information for defining at least one default level,
        wherein the extra information is associated with the default level information, and is used for setting a level corresponding to the region;
    decoding the extra information depending on the first flag; and
    setting the level corresponding to the region using the default level information and the extra information.

2. The method of claim 1, wherein the default level information represents the at least one default level applicable to the pictures included in the video sequence,
wherein the extra information include:
number information for representing the number of extra levels applicable to the region, and
as many extra level syntax elements as the number of extra levels, the extra level syntax elements representing the extra levels respectively.

3. The method of claim 2, wherein the setting of the level corresponding to the region comprising:
decoding one or more designation syntax elements for selecting one among the at least one default level and the extra levels, from a header in which syntax elements related to the region are included, and
setting the level corresponding to the region among the at least one default level and the extra levels using the one or more designation syntax elements.

4. The method of claim 3, wherein one or more designation syntax elements include:
a second flag for indicating whether the at least one default level is applied to the region, and
an indicator which indicates one among the extra levels and is decoded when the second flag indicates that the at least one default level is not applied.

5. The method of claim 4, wherein the level corresponding to the region is set to:
an extra level indicated by the indicator among the extra levels when the second flag indicates that the at least one default level is not applied, and
at least one default level when the second flag indicates that the at least one default level is applied.

6. The method of claim 2, wherein the default level information is decoded from a header of the video sequence, and the extra information is decoded from a header of a picture level.

7. A video encoding method for encoding, into an SEI (supplemental enhancement information) message of a bitstream, level information for each of a plurality of regions partitioned from each of pictures included in a video sequence, the level information being information for defining a level of decoding capability of a video decoding apparatus including maximum resolution up to which the video decoding apparatus is processible, the method comprising:
encoding a first flag indicating whether extra information is defined, and default level information for defining at least one default level,
wherein the extra information is associated with the default level information, and is used for setting a level corresponding to the region;
depending on the first flag, encoding the extra information such that the video decoding apparatus sets the level corresponding to the region using the default level information and the extra information.

8. The video encoding method of claim 7, wherein the default level information represents the at least one default level applicable to the pictures included in the video sequence,
wherein the extra information include:
number information for representing the number of extra levels applicable to the region, and
as many extra level syntax elements as the number of extra levels, the extra level syntax elements representing the extra levels respectively.

9. The video encoding method of claim 8, further comprising:
encoding one or more designation syntax elements for selecting one among the at least one default level and the extra levels, in a header in which syntax elements related to the region are included.

10. The video encoding method of claim 9, wherein one or more designation syntax elements include:
a second flag for indicating whether the at least one default level is applied to the region, and
an indicator which indicates one among the extra levels and is encoded when the second flag indicates that the at least one default level is not applied.

11. The video encoding method of claim 8, wherein the default level information is encoded in a header of the video sequence, and the extra information is encoded in a header of a picture level.

12. A method for transmitting a bitstream containing level information for each of a plurality of regions partitioned from each of pictures included in a video sequence, the level information being information for defining a level of decoding capability of a video decoding apparatus including maximum resolution up to which the video decoding apparatus is processible, the method comprising:
generating the bitstream by encoding the level information into an SEI (supplemental enhancement information) message; and
transmitting the bitstream to the video decoding apparatus,
wherein the encoding of the level information comprises:
encoding a first flag indicating whether extra information is defined, and default level information for defining at least one default level,
wherein the extra information is associated with the default level information, and is used for setting a level corresponding to the region; and
depending on the first flag, encoding the extra information such that the video decoding apparatus sets the level corresponding to the region using the default level information and the extra information.

* * * * *